United States Patent
Jin et al.

(10) Patent No.: US 12,361,213 B2
(45) Date of Patent: *Jul. 15, 2025

(54) SYSTEMS AND METHODS FOR DATA PARSING

(71) Applicant: Plaid Inc., San Francisco, CA (US)

(72) Inventors: Zhongkun Jin, Ridgefield, CT (US); Louis Ben Arous, Philadelphia, PA (US); Kinako Abe, Union City, NJ (US); Yulia Barannikova, Brooklyn, NY (US)

(73) Assignee: Plaid Inc., San Francisco, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 17/658,416

(22) Filed: Apr. 7, 2022

(65) Prior Publication Data

US 2022/0229980 A1    Jul. 21, 2022

Related U.S. Application Data

(63) Continuation-in-part of application No. 17/499,696, filed on Oct. 12, 2021, now Pat. No. 11,327,960.

(Continued)

(51) Int. Cl.
*G06F 16/00* (2019.01)
*G06F 40/126* (2020.01)
(Continued)

(52) U.S. Cl.
CPC .......... *G06F 40/205* (2020.01); *G06F 40/126* (2020.01); *G06F 40/284* (2020.01); *G06N 3/045* (2023.01)

(58) Field of Classification Search
CPC ... G06N 3/02; G06N 3/04; G06N 3/08; G06F 40/205; G06F 40/126; G06F 40/284
See application file for complete search history.

(56) References Cited

U.S. PATENT DOCUMENTS

| 5,063,507 A | 11/1991 | Lindsey et al. |
| 5,237,499 A | 8/1993 | Garback |

(Continued)

FOREIGN PATENT DOCUMENTS

| EP | 0 848 336 | 6/1998 |
| EP | 0 848 338 | 6/1998 |

(Continued)

OTHER PUBLICATIONS

U.S. Appl. No. 17/302630, System and Method for Programmatically Accessing Financial Data, filed May 7, 2021.

(Continued)

*Primary Examiner* — Leslie Wong
(74) *Attorney, Agent, or Firm* — Harrity & Harrity, LLP

(57) ABSTRACT

Systems and methods for data parsing are disclosed. In one aspect, a method of parsing raw data associated with one or more transactions involves receiving a text string including raw data for a transaction, matching the text string to a plurality of locations within a location corpus to extract location information from the text string, and identifying a candidate entity from the text string based on a similarity score with respect to a plurality of entities within an entity corpus. The method further involves in response to the similarity score of the identified candidate entity being less than a threshold score, generating entity information using the tokens indicative of entity information, and generating normalized transaction data including the extracted location information and one of the identified candidate entity or the generated entity information.

20 Claims, 20 Drawing Sheets

Related U.S. Application Data

(60) Provisional application No. 63/093,081, filed on Oct. 16, 2020.

(51) Int. Cl.
   *G06F 40/205* (2020.01)
   *G06F 40/284* (2020.01)
   *G06N 3/045* (2023.01)

(56) References Cited

U.S. PATENT DOCUMENTS

| | | |
|---|---|---|
| 5,347,632 A | 9/1994 | Filepp |
| 5,634,127 A | 5/1997 | Cloud |
| 5,649,186 A | 7/1997 | Ferguson |
| 5,701,451 A | 12/1997 | Rogers |
| 5,710,884 A | 1/1998 | Dedrick |
| 5,710,918 A | 1/1998 | Lagarde |
| 5,721,908 A | 2/1998 | Lagarde |
| 5,727,159 A | 3/1998 | Kikinis |
| 5,745,754 A | 4/1998 | Lagarde |
| 5,752,246 A | 5/1998 | Rogers |
| 5,778,065 A | 7/1998 | Hauser et al. |
| 5,778,367 A | 7/1998 | Wesinger, Jr. et al. |
| 5,787,403 A | 7/1998 | Randle |
| 5,793,964 A | 8/1998 | Rogers |
| 5,813,007 A | 9/1998 | Nielsen |
| 5,815,665 A | 9/1998 | Teper |
| 5,819,284 A | 10/1998 | Farber |
| 5,835,724 A | 11/1998 | Smith |
| 5,838,910 A | 11/1998 | Domenikos et al. |
| 5,838,916 A | 11/1998 | Domenikos et al. |
| 5,845,073 A | 12/1998 | Carlin |
| 5,855,018 A | 12/1998 | Chor et al. |
| 5,862,325 A | 1/1999 | Reed et al. |
| 5,870,559 A | 2/1999 | Leshem et al. |
| 5,875,296 A | 2/1999 | Shi |
| 5,878,219 A | 3/1999 | Vance |
| 5,892,905 A | 4/1999 | Brandt et al. |
| 5,892,909 A | 4/1999 | Grasso |
| 5,898,836 A | 4/1999 | Freivald |
| 5,901,287 A | 5/1999 | Bull |
| 5,903,881 A | 5/1999 | Schrader |
| 5,908,469 A | 6/1999 | Botz |
| 5,913,214 A | 6/1999 | Madnick |
| 5,918,216 A | 6/1999 | Miksovsky et al. |
| 5,920,848 A | 7/1999 | Schutzer |
| 5,926,798 A | 7/1999 | Carter |
| 5,930,764 A | 7/1999 | Melchione et al. |
| 5,930,777 A | 7/1999 | Barber |
| 5,933,604 A | 8/1999 | Inakoshi |
| 5,933,816 A | 8/1999 | Zeanah |
| 5,956,720 A | 9/1999 | Fernandez et al. |
| 5,961,593 A | 10/1999 | Gabber et al. |
| 5,961,601 A | 10/1999 | Iyengar |
| 5,963,915 A | 10/1999 | Kirsch |
| 5,963,925 A | 10/1999 | Kolling |
| 5,966,967 A | 10/1999 | Agrawal |
| 5,978,828 A | 11/1999 | Greer |
| 5,978,842 A | 11/1999 | Noble |
| 5,983,267 A | 11/1999 | Shklar et al. |
| 5,983,268 A | 11/1999 | Freivald |
| 5,987,440 A | 11/1999 | O'Neil |
| 5,987,454 A | 11/1999 | Hobbs |
| 5,995,943 A | 11/1999 | Bull |
| 5,999,971 A | 12/1999 | Buckland |
| 6,003,032 A | 12/1999 | Bunney et al. |
| 6,006,333 A | 12/1999 | Nielsen |
| 6,023,698 A | 2/2000 | Lavey |
| 6,041,362 A | 3/2000 | Mears et al. |
| 6,047,327 A | 4/2000 | Tso et al. |
| 6,055,570 A | 4/2000 | Nielsen |
| 6,078,929 A | 6/2000 | Rao |
| 6,082,776 A | 7/2000 | Feinberg |
| 6,092,196 A | 7/2000 | Reiche |
| 6,092,197 A | 7/2000 | Coueignoux |
| 6,105,131 A | 8/2000 | Carroll |
| 6,119,101 A | 9/2000 | Peckover |
| 6,138,158 A | 10/2000 | Boyle |
| 6,148,337 A | 11/2000 | Estberg et al. |
| 6,151,581 A | 11/2000 | Kraftson et al. |
| 6,151,601 A | 11/2000 | Papierniak |
| 6,182,142 B1 | 1/2001 | Win |
| 6,185,567 B1 | 2/2001 | Ratnaraj et al. |
| 6,195,698 B1 | 2/2001 | Lillibridge et al. |
| 6,199,077 B1 | 3/2001 | Inala |
| 6,205,433 B1 | 3/2001 | Boesch |
| 6,208,975 B1 | 3/2001 | Bull |
| 6,209,007 B1 | 3/2001 | Kelley et al. |
| 6,243,816 B1 | 6/2001 | Fang et al. |
| 6,246,999 B1 | 6/2001 | Riley et al. |
| 6,278,449 B1 | 8/2001 | Sugiarto et al. |
| 6,278,999 B1 | 8/2001 | Knapp |
| 6,292,789 B1 | 9/2001 | Schutzer |
| 6,297,819 B1 | 10/2001 | Furst |
| 6,301,584 B1 | 10/2001 | Ranger |
| 6,308,203 B1 | 10/2001 | Itabashi et al. |
| 6,311,275 B1 | 10/2001 | Jin et al. |
| 6,317,783 B1 | 11/2001 | Freishtat |
| 6,360,205 B1 | 3/2002 | Iyengar |
| 6,366,933 B1 | 4/2002 | Ball et al. |
| 6,401,118 B1 | 6/2002 | Thomas |
| 6,405,245 B1 | 6/2002 | Burson |
| 6,412,073 B1 | 6/2002 | Rangan |
| 6,424,968 B1 | 7/2002 | Broster |
| 6,430,539 B1 * | 8/2002 | Lazarus ............... G06Q 30/02 705/14.1 |
| 6,484,155 B1 | 11/2002 | Kiss |
| 6,499,042 B1 | 12/2002 | Markus |
| 6,510,451 B2 | 1/2003 | Wu |
| 6,519,571 B1 | 2/2003 | Guhen et al. |
| 6,567,411 B2 | 5/2003 | Dahlen |
| 6,567,850 B1 | 5/2003 | Freishtat |
| 6,594,766 B2 | 7/2003 | Rangan |
| 6,632,248 B1 | 10/2003 | Isaac et al. |
| 6,633,910 B1 | 10/2003 | Rajan |
| 6,631,402 B1 | 11/2003 | Devine |
| 6,725,200 B1 | 4/2004 | Rost |
| 6,802,042 B2 | 10/2004 | Rangan |
| 6,859,931 B1 | 2/2005 | Cheyer et al. |
| 6,957,199 B1 | 10/2005 | Fisher |
| 7,028,049 B1 | 4/2006 | Shelton |
| 7,072,932 B1 | 7/2006 | Stahl |
| 7,092,913 B2 | 8/2006 | Cannon, Jr. |
| 7,200,578 B2 | 4/2007 | Paltenghe et al. |
| 7,263,548 B2 | 8/2007 | Daswani |
| 7,275,046 B1 | 9/2007 | Tritt et al. |
| 7,340,411 B2 | 3/2008 | Cook |
| 7,370,011 B2 | 5/2008 | Bennett et al. |
| 7,424,520 B2 | 9/2008 | Daswani |
| 7,640,210 B2 | 12/2009 | Bennett et al. |
| 7,752,535 B2 | 7/2010 | Satyavolu |
| 8,006,291 B2 | 8/2011 | Headley et al. |
| 8,010,783 B1 | 8/2011 | Cahill |
| 8,086,508 B2 | 12/2011 | Dheer et al. |
| 8,140,431 B1 | 3/2012 | Murphy |
| 8,145,914 B2 | 3/2012 | Steeves |
| 8,166,562 B2 | 4/2012 | Holvey et al. |
| 8,209,194 B1 | 6/2012 | Nidy et al. |
| 8,266,515 B2 | 9/2012 | Satyavolu |
| 8,613,066 B1 | 12/2013 | Brezinski et al. |
| 8,645,264 B2 | 2/2014 | Allison et al. |
| 8,676,611 B2 | 3/2014 | McLaughlin et al. |
| 8,739,260 B1 | 5/2014 | Damm-Goossens |
| 8,788,416 B1 | 7/2014 | Vu |
| 8,995,967 B1 | 3/2015 | Billman |
| 9,106,642 B1 | 8/2015 | Bhimanail |
| 9,202,250 B1 | 12/2015 | Palaniappan |
| 9,418,387 B1 | 8/2016 | Aaron |
| 9,430,892 B2 | 8/2016 | Amdahl |
| 9,449,346 B1 | 9/2016 | Hockey |
| 9,595,023 B1 | 3/2017 | Hockey et al. |
| 9,699,187 B2 | 7/2017 | Chen et al. |
| 9,774,590 B1 | 9/2017 | Bronshtein et al. |
| 9,906,520 B2 | 2/2018 | Fouad et al. |

(56) References Cited

U.S. PATENT DOCUMENTS

| | | |
|---|---|---|
| 9,946,996 B1 | 4/2018 | Bedell |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,339,608 B1 | 7/2019 | Haitz et al. |
| 10,395,654 B2 * | 8/2019 | Golipour .......... G10L 15/22 |
| 10,523,653 B2 | 12/2019 | Hockey et al. |
| 10,530,761 B2 | 1/2020 | Hockey et al. |
| 10,546,348 B1 | 1/2020 | Lesner et al. |
| 10,572,607 B1 * | 2/2020 | Lesner .......... G06F 40/58 |
| 10,614,463 B1 | 4/2020 | Hockey et al. |
| 10,679,303 B1 | 6/2020 | Aaron et al. |
| 10,726,491 B1 | 7/2020 | Hockey et al. |
| 10,762,559 B2 | 9/2020 | Alejo et al. |
| 10,878,421 B2 | 12/2020 | Putnam |
| 10,904,239 B2 | 1/2021 | Hockey et al. |
| 10,984,468 B1 | 4/2021 | Hockey et al. |
| 11,030,682 B1 | 6/2021 | Hockey et al. |
| 11,050,729 B2 | 6/2021 | Hockey et al. |
| 11,216,814 B1 | 1/2022 | Hockey et al. |
| 11,316,862 B1 | 4/2022 | Pate et al. |
| 11,327,960 B1 | 5/2022 | Jin et al. |
| 11,430,057 B1 | 8/2022 | Hockey et al. |
| 11,580,145 B1 * | 2/2023 | Kumar .......... G06N 3/092 |
| 11,769,011 B2 * | 9/2023 | Yang .......... G06N 20/00 |
| | | 704/9 |
| 11,893,469 B2 * | 2/2024 | Wagner .......... G06N 3/02 |
| 11,978,106 B2 * | 5/2024 | Jain .......... G06F 18/2413 |
| 12,079,282 B2 * | 9/2024 | Mumcuyan .......... G06N 3/084 |
| 2001/0011274 A1 | 8/2001 | Klug et al. |
| 2002/0002596 A1 | 1/2002 | Sugiarto et al. |
| 2002/0065772 A1 | 5/2002 | Saliba et al. |
| 2002/0091635 A1 | 7/2002 | Dilip et al. |
| 2002/0095588 A1 | 7/2002 | Shigematsu et al. |
| 2003/0023879 A1 | 1/2003 | Wray |
| 2003/0028646 A1 | 2/2003 | Wray |
| 2003/0060896 A9 | 3/2003 | Hulai |
| 2003/0158960 A1 | 8/2003 | Engberg |
| 2003/0163425 A1 | 8/2003 | Cannon, Jr. |
| 2003/0182035 A1 | 9/2003 | DiLodovico et al. |
| 2003/0185370 A1 | 10/2003 | Rosera et al. |
| 2003/0204460 A1 | 10/2003 | Robinson et al. |
| 2004/0059672 A1 | 3/2004 | Baig et al. |
| 2005/0027617 A1 | 2/2005 | Zucker et al. |
| 2005/0154913 A1 | 7/2005 | Barriga et al. |
| 2005/0177510 A1 | 8/2005 | Hilt et al. |
| 2005/0222929 A1 | 10/2005 | Steier et al. |
| 2005/0246269 A1 | 11/2005 | Smith |
| 2006/0015358 A1 | 1/2006 | Chua |
| 2006/0116949 A1 | 6/2006 | Wehunt et al. |
| 2006/0136332 A1 | 6/2006 | Ziegler |
| 2006/0190569 A1 | 8/2006 | Neil |
| 2006/0236384 A1 | 10/2006 | Lindholm et al. |
| 2007/0179883 A1 | 8/2007 | Questembert |
| 2007/0179942 A1 | 8/2007 | Heggem |
| 2007/0198432 A1 | 8/2007 | Pitroda et al. |
| 2007/0225047 A1 | 9/2007 | Bakos |
| 2007/0255662 A1 | 11/2007 | Tumminaro |
| 2007/0289002 A1 | 12/2007 | van der Horst et al. |
| 2008/0051059 A1 | 2/2008 | Fisher |
| 2008/0052192 A1 | 2/2008 | Fisher |
| 2008/0052233 A1 | 2/2008 | Fisher |
| 2008/0120129 A1 | 5/2008 | Seubert et al. |
| 2008/0162361 A1 | 7/2008 | Sklovsky |
| 2008/0183628 A1 | 7/2008 | Oliver et al. |
| 2008/0243784 A1 | 10/2008 | Stading |
| 2008/0249931 A1 | 10/2008 | Gilder et al. |
| 2008/0250246 A1 | 10/2008 | Arditti et al. |
| 2009/0037308 A1 | 2/2009 | Feinstein |
| 2009/0070257 A1 | 3/2009 | Csoka |
| 2009/0157555 A1 | 6/2009 | Biffle et al. |
| 2009/0222900 A1 | 9/2009 | Benaloh et al. |
| 2009/0228779 A1 | 9/2009 | Williamson et al. |
| 2009/0245521 A1 | 10/2009 | Vembu |
| 2009/0271847 A1 | 10/2009 | Karjala et al. |
| 2009/0328177 A1 | 12/2009 | Frey et al. |
| 2010/0027552 A1 | 2/2010 | Hill |
| 2010/0043054 A1 | 2/2010 | Kidwell |
| 2010/0049850 A1 | 2/2010 | Nanduri et al. |
| 2010/0169072 A1 | 7/2010 | Zaki et al. |
| 2010/0185868 A1 | 7/2010 | Grecia |
| 2010/0223160 A1 | 9/2010 | Brown |
| 2010/0235882 A1 | 9/2010 | Moore |
| 2010/0313255 A1 | 12/2010 | Khuda |
| 2010/0325710 A1 | 12/2010 | Etchegoyen |
| 2011/0055079 A1 | 3/2011 | Meaney et al. |
| 2011/0196790 A1 | 8/2011 | Milne |
| 2011/0238550 A1 | 9/2011 | Reich et al. |
| 2011/0247060 A1 | 10/2011 | Whitmyer, Jr. |
| 2011/0295731 A1 | 12/2011 | Waldron, III et al. |
| 2012/0059706 A1 | 3/2012 | Goenka et al. |
| 2012/0116880 A1 | 5/2012 | Patel et al. |
| 2012/0129503 A1 | 5/2012 | Lindeman et al. |
| 2012/0191603 A1 | 7/2012 | Nuzzi |
| 2012/0209775 A1 | 8/2012 | Milne |
| 2012/0215688 A1 | 8/2012 | Musser et al. |
| 2012/0233212 A1 | 9/2012 | Newton et al. |
| 2012/0246073 A1 | 9/2012 | Gore et al. |
| 2012/0253876 A1 | 10/2012 | Hersch |
| 2012/0278201 A1 | 11/2012 | Milne |
| 2012/0281058 A1 | 11/2012 | Laney et al. |
| 2012/0284175 A1 | 11/2012 | Wilson et al. |
| 2012/0323717 A1 | 12/2012 | Kirsch |
| 2013/0019297 A1 | 1/2013 | Lawson et al. |
| 2013/0041736 A1 | 2/2013 | Coppinger |
| 2013/0041739 A1 | 2/2013 | Coppinger |
| 2013/0041744 A1 | 2/2013 | Coppinger |
| 2013/0046599 A1 | 2/2013 | Coppinger |
| 2013/0097685 A1 | 4/2013 | Kennedy et al. |
| 2013/0125223 A1 | 5/2013 | Sorotokin et al. |
| 2013/0174015 A1 | 7/2013 | Jeff L. |
| 2013/0191526 A1 | 7/2013 | Zhao |
| 2013/0232006 A1 | 9/2013 | Holcomb et al. |
| 2013/0232159 A1 | 9/2013 | Daya et al. |
| 2013/0247005 A1 | 9/2013 | Hirsch et al. |
| 2013/0282577 A1 | 10/2013 | Milne |
| 2013/0318592 A1 | 11/2013 | Grier, Sr. et al. |
| 2014/0032414 A1 | 1/2014 | Beisner et al. |
| 2014/0040148 A1 | 2/2014 | Ozvat et al. |
| 2014/0044123 A1 | 2/2014 | Lawson et al. |
| 2014/0067499 A1 | 3/2014 | Stepanovich |
| 2014/0150072 A1 | 5/2014 | Castro et al. |
| 2014/0165156 A1 | 6/2014 | Fushman et al. |
| 2014/0173695 A1 | 6/2014 | Valdivia |
| 2014/0180962 A1 | 6/2014 | Fiala et al. |
| 2014/0189002 A1 | 7/2014 | Orioli et al. |
| 2014/0189808 A1 | 7/2014 | Mahaffey et al. |
| 2014/0189828 A1 | 7/2014 | Baghdasaryan et al. |
| 2014/0208389 A1 | 7/2014 | Kelley |
| 2014/0215551 A1 | 7/2014 | Allain et al. |
| 2014/0229462 A1 | 8/2014 | Lo |
| 2014/0236716 A1 | 8/2014 | Shapiro et al. |
| 2014/0245411 A1 | 8/2014 | Meng et al. |
| 2014/0258063 A1 | 9/2014 | Chourasia et al. |
| 2014/0280555 A1 | 9/2014 | Tapia et al. |
| 2014/0344141 A1 | 11/2014 | Cook |
| 2014/0358704 A1 | 12/2014 | Banerjee et al. |
| 2014/0365350 A1 | 12/2014 | Shvarts |
| 2015/0026024 A1 | 1/2015 | Calman et al. |
| 2015/0046338 A1 | 2/2015 | Laxminarayanan et al. |
| 2015/0066719 A1 | 3/2015 | Agrawal et al. |
| 2015/0066765 A1 | 3/2015 | Banks et al. |
| 2015/0088707 A1 | 3/2015 | Drury et al. |
| 2015/0088732 A1 | 3/2015 | DeVan, Jr. et al. |
| 2015/0113511 A1 | 4/2015 | Poulin |
| 2015/0161608 A1 | 6/2015 | Gilbert |
| 2015/0193871 A1 | 7/2015 | Murphy |
| 2015/0254672 A1 | 9/2015 | Huesch et al. |
| 2015/0281225 A1 | 10/2015 | Schoen et al. |
| 2015/0310562 A1 | 10/2015 | Chourasia et al. |
| 2015/0339664 A1 | 11/2015 | Wong et al. |
| 2015/0365399 A1 | 12/2015 | Biswas et al. |
| 2016/0063657 A1 | 3/2016 | Chen et al. |
| 2017/0098264 A1 * | 4/2017 | Priebatsch .......... H04L 67/52 |

(56) References Cited

U.S. PATENT DOCUMENTS

| | | | |
|---|---|---|---|
| 2017/0118301 A1 | 4/2017 | Kouru et al. | |
| 2017/0132633 A1 | 5/2017 | Whitehouse | |
| 2017/0148021 A1 | 5/2017 | Goldstein et al. | |
| 2017/0193112 A1 | 7/2017 | Desineni et al. | |
| 2017/0193486 A1 | 7/2017 | Parekh | |
| 2017/0200137 A1 | 7/2017 | Vilmont | |
| 2017/0200234 A1 | 7/2017 | Morse | |
| 2017/0262840 A1 | 9/2017 | Dunwoody | |
| 2017/0300960 A1 | 10/2017 | Khvostov et al. | |
| 2017/0301013 A1 | 10/2017 | Alejo et al. | |
| 2017/0308902 A1 | 10/2017 | Quiroga et al. | |
| 2018/0060927 A1 | 3/2018 | Gupta | |
| 2018/0157851 A1 | 6/2018 | Sgambati et al. | |
| 2018/0191685 A1 | 7/2018 | Bajoria | |
| 2018/0196694 A1 | 7/2018 | Banerjee et al. | |
| 2018/0232734 A1 | 8/2018 | Smets et al. | |
| 2018/0246943 A1 | 8/2018 | Avagyan et al. | |
| 2018/0267847 A1 | 9/2018 | Smith et al. | |
| 2018/0267874 A1 | 9/2018 | Keremane et al. | |
| 2018/0330342 A1 | 11/2018 | Prakash et al. | |
| 2018/0349909 A1 | 12/2018 | Allen et al. | |
| 2018/0367428 A1 | 12/2018 | Di Pietro et al. | |
| 2019/0075115 A1 | 3/2019 | Anderson et al. | |
| 2019/0180364 A1 | 6/2019 | Chong et al. | |
| 2019/0333159 A1 | 10/2019 | Chourasia et al. | |
| 2019/0354544 A1 | 11/2019 | Hertz et al. | |
| 2020/0110585 A1 | 4/2020 | Perry | |
| 2020/0201878 A1 | 6/2020 | Putnam et al. | |
| 2020/0234376 A1 | 7/2020 | Lord et al. | |
| 2021/0004439 A1 | 1/2021 | Xiong et al. | |
| 2021/0165960 A1 | 6/2021 | Eisenschlos et al. | |
| 2021/0217016 A1 | 7/2021 | Putman | |
| 2021/0233162 A1 | 7/2021 | Hockey et al. | |
| 2021/0281558 A1 | 9/2021 | Hockey et al. | |
| 2021/0288956 A1 | 9/2021 | Hockey et al. | |
| 2021/0350340 A1 | 11/2021 | Lai et al. | |
| 2021/0390270 A1* | 12/2021 | Fei | G06F 40/151 |
| 2022/0217147 A1 | 7/2022 | Pate et al. | |

FOREIGN PATENT DOCUMENTS

| | | |
|---|---|---|
| EP | 0 848 339 | 6/1998 |
| EP | 2 747 374 | 6/2014 |
| EP | 3 347 846 | 7/2018 |
| WO | WO 96/38795 | 12/1996 |
| WO | WO 97/10542 | 3/1997 |
| WO | WO 97/09682 | 5/1997 |
| WO | WO 97/26612 | 7/1997 |
| WO | WO 97/37314 | 10/1997 |
| WO | WO 98/14896 | 4/1998 |
| WO | WO 00/25227 | 5/2000 |
| WO | WO 2017/044479 | 3/2017 |
| WO | WO 2017/173021 | 10/2017 |
| WO | WO 2022/082186 | 4/2022 |

OTHER PUBLICATIONS

U.S. Appl. No. 14/719,110, System and Method for Programmatically Accessing Financial Data, filed May 21, 2015.

U.S. Appl. No. 14/719,117, System and Method for Facilitating Programmatic Verification of Transactions, filed May 21, 2015.

U.S. Appl. No. 17/533,728, System and Method for Facilitating Programmatic Verification of Transactions, filed Nov. 23, 2021.

U.S. Appl. No. 17/303,432, Secure Permissioning of Access to User Accounts, Including Secure Deauthorization of Access to User Accounts, filed May 28, 2021.

U.S. Appl. No. 17/266,7673, Secure Permissioning of Access to User Accounts, Including Secure Deauthorization of Access to User Accounts, filed Dec. 18, 2020.

U.S. Appl. No. 17/815,024, Parameter-Based Computer Evaluation of User Accounts Based on User Account Data Stored in One or More Databases, filed Jul. 26, 2022.

U.S. Appl. No. 17/230,835, Systems and Methods for Estimating Past and Prospective Attribute Values Associated With a User Account, filed Apr. 14, 2021.

U.S. Appl. No. 17/656,528, Secure Authorization of Access to User Accounts by One or More Authorization Mechanisms, filed Mar. 25, 2022.

U.S. Appl. No. 16/042,147, Browser-Based Aggregation, filed Jul. 23, 2018.

U.S. Appl. No. 17/842,444, Browser-Based Aggregation, filed Jun. 16, 2022.

U.S. Appl. No. 17/103,267, Data Verified Deposits, filed Nov. 24, 2020.

U.S. Appl. No. 17/302,499, Secure Updating of Allocations to user accounts, filed May 4, 2021.

U.S. Appl. No. 17/658,416, Systems and Methods for Data Parsing, filed Apr. 7, 2022.

Adam et al., "Backend Server System Design Based on Rest API for Cashless Payment System on Retail Community", International Electronics Symposium (IES), Sep. 2019, pp. 208-213.

Chard et al., "Efficient and Secure Transfer, Synchronization, and Sharing of Big Data", IEEE Cloud Computing, 2014, vol. 1, Issue 3, pp. 46-55.

European Search Report in EP Application No. 21215799.4 dated Mar. 25, 2022, 8 pages.

U.S. Appl. No. 17/533,827, System and Method for Facilitating Programmatic Verification of Transactions, filed Nov. 23, 2021.

U.S. Appl. No. 17/126,673, Secure Permissioning of Access to User Accounts, Including Secure Deauthorization of Access to User Accounts, filed Dec. 18, 2020.

U.S. Appl. No. 16/900,052, Parameter-Based Computer Evaluation of User Accounts Based on User Account Data Stored in One or More Databases, filed Jun. 12, 2020.

U.S. Appl. No. 17/230,835, Systems and Methods for Estimating Past and Prospective Attribute Values Associated With a User Account, Apr. 14, 2021.

U.S. Appl. No. 16/570,630, Secure Authorization of Access to User Accounts by One or More Authorization Mechanisms, filed Sep. 13, 2019.

U.S. Appl. No. 17/499,696, Systems and Methods for Data Parsing, filed Oct. 12, 2021.

"A Single Login Web Service Integrator—WebEntrance", Yan Zhao, Sixth International World Wide Web Conference, Santa Clara, CA, Apr. 7-11, 1997, 10 pages.

"Automatic Notification of Web Sites Changes," Google Groups, Aug. 30, 1995, 1 page.

"Boeing Chooses NetMind Enterprise Minder to Help Thousands of Employees Track Web-Based Information," PR Newswire, Nov. 19, 1998, 3 pages.

"Caravelle's InfoWatcher 1.1 Keeps an Eye on the Web," PC Week 1997, 2 pages.

"Cognisoft Announces IntelliServ, A Revolutionary Intranet Information Management Application; a Powerful Solution that Enables the Right Information to Find the Right User at the Right Time," Business Wire, Aug. 14, 1996, 4 pages.

"FirstFloor and AirMedia Announce Partnership," Business Wire 1997 ("FirstFloor"), 2 pages.

"Fujitsu Announces 'WebAgent' Application as part of ByeDesk Link Wireless Server Software," Business Wire, Sep. 1, 1998, 3 pages.

"Fujitsu Announces Availability of ByeDesk Link for Alpha-Numeric Pagers; Next Step in Empowering Mobile Workforces with 'Anyplace, Anytime' Information," Business Wire, Jul. 9, 1998, 3 pages.

"Fujitsu Picks NetMind for Wireless Web Agent Software," Computergram International, Sep. 2, 1998, 1 page.

"Fujitsu's ByeDesk Link Now Available on the PalmPilot," Business Wire, Sep. 21, 1998, 4 pages.

"GC Tech's GlobeID Payment Internet Commerce Software Supports Microsoft, Merchant Server," Business Wire, Jan. 21, 1997, 3 pages.

"Highly Scalable On-Line Payments via Task Decoupling," Financial Cryptography First International Conference, 1998, 2 pages.

"Minding Web Site Changes," PC Week, Sep. 14, 1998, 3 pages.

(56) References Cited

OTHER PUBLICATIONS

"NetMind Accepts $7 Million Strategic Investment From Three Prominent VC Firms—BancBoston, Softbank and Draper Fisher Jurvestson," PR Newswire, Nov. 6, 1998, 3 pages.
"NetMind Updates the World's Largest Free Web Tracking Service," PR Newswire, Sep. 18, 1998, 4 pages.
"The AT&T Internet Difference Engine: Tracking and Viewing Changes on the Web," World Wide Web 1 (1); Jan. 1998, pp. 1-29.
"Versatile Intelligent Agents in Commercial Applications," Google Groups, Dec. 12, 1998, 9 pages.
"Web Interface Definition Language (WIDL)", W3 Consortium submission from webMethods, Inc., Sep. 22, 1997, 15 pages.
"WebEntree: A Web Service Aggregator", Y. Zhao, IBM Systems Journal, vol. 37, No. 4, 1998, 12 pages.
A hierarchical approach to wrapper induction, Ion Muslea, Steve Minton, and Craig A. Knoblock. In Proceedings of the 3rd International Conference on Autonomous Agents 1999, Seattle, WA, 1999. May 1-5, 1999, 8 pages.
Building agents for internet-base supply chain integration, Craig A. Knoblock and Steven Minton. In Proceedings of the Workshop on Agents for Electronic Commerce and Managing the Internet-Enabled Supply Chain, Seattle, WA, 1999. May 1-5, 1999, 6 pages.
Chaulagain et al., "Cloud Based Web Scraping for Big Data Application." IEEE International Conference on Smart Cloud, 2017, pp. 138-143.
Corena et al., "Secure and fast aggregation of financial data in cloud-based expense tracking applications." Journal of Network and Systems Management 20.4 (2012): 534-560.
Devlin, J. et al., "BERT: Pre-training of Deep Bidirectional Transformers for Language Understanding," arXive, May 24, 2019, retrieved from the internet, URL: https://arxiv.org/pdf/1810.04805.pdf, 16 pages.
Hagel et al. "The Coming Battle for Customer Information." Harvard Business Review, Jan.-Feb. 1997, reprint No. 97104, 20 pages.
Hummer, Waldemar, Philipp Leitner, and Schahram Dustdar. "Ws-aggregation: distributed of web services data." Proceedings of the 2011 ACM Symposium on Applied Computing. ACM, 2011, 8 pages.
Intelligent caching for information mediators: A kr based approach, Naveen Ashish, Craig A. Knoblock, and Cyrus Shahabi. In Proceedings of the Workshop on Knowledge Representation meets Databases (KRDB), Seattle, WA, 1998. Presented May 1, 1998, 7 pages.
Jin, C., "How Plaid parses transaction data," Oct. 22, 2020, retrieved from the internet, URL: https://plaid.com/blog/how-plaid-parsestransaction-data/, 10 pages.
Johner et al. "Sign on with IBM's Global Sign-On!" IBM manual, Nov. 1998. Part 1, in 184 pages.
Johner et al. "Sign on with IBM's Global Sign-On!" IBM manual, Nov. 1998. Part 2, pp. 166-307.
Kim, Young-Gon et al., 'A Design of User Authentication System Using QR code Identifying Method', 6th International Conference on Computer Sciences and Convergence Information Technology (ICCIT), pp. 31-35, 2011.
Kyeongwon C., et al., 'A Mobile based Anti-Phishing Authentication Scheme using QR code', IEEE International Conference on Mobile IT Convergence, pp. 109-113, 2011.
M. C. McChesney, "Banking in cyberspace: an investment in itself," IEEE Spectrum, vol. 34, No. 2, Feb. 1997, pp. 54-59.
Mancini et al., "Simulation in the Cloud Using Handheld Devices," Workshop on Modeling and Simulation on Grid and Cloud Computing, Apr. 25, 2012, 8 pages.
Modeling web sources for information integration, Craig A. Knoblock, Steven Minton, Jose Luis Ambite, Naveen Ashish, Pragnesh Jay Modi, Ion Muslea, Andrew G. Philpot, and Sheila Tejada. In Proceedings of the Fifteenth National Conference on Artificial Intelligence, Madison, WI, 1998. Jul. 26-30, 1998, 9 pages.
Mohammed et al. A Multi-layer of Multi Factors Authentication Model for Online Banking Services, Oct. 15, 2013, 2013 International Conference on Computing, Electrical and Electronic Engineering (ICCEEE), pp. 220-224.
Neville, S.W. et al. Efficiently Archieving Full Three-Way Non-repudiation in Consumer-level eCommerce and M-Commerce Transactions, Nov. 1, 2011, 2011 IEEE 10th International Conference on Trust, Security and Privacy in Computing and Communications, pp. 664-672.
Optimizing Information Agents by Selectively Materializing Data, Naveen Ashish, Craig A. Knoblock, and Cyrus Shahabi. In Proceedings of the AAAI'98 Workshop on AI and Information Integration, Madison, WI, 1998. Jul. 26-30, 1998, 6 pages.
O'Riain et al., "XBRL and open data for global financial ecosystems: A linked data approach." International Journal of Accounting Information Systems 13.2 (2012): 141-162.
Quwaider et al., "Experimental Framework for Mobile Cloud Computing System", Jordan University of Science and Technology, Procedia Computer Science 52, 2015, pp. 1147-1152.
Semi-automatic wrapper generation for Internet information sources, Naveen Ashish and Craig A. Knoblock. In Proceedings of the Second IFCIS International Conference on Cooperative Information Systems, Kiawah Island, SC, 1997. Jun. 24-27, 1997, 10 pages.
Sunwoo et al., "A Structured Approach to the Simulation, Analysis and Characterization of Smartphone Applications", IEEE 2013, pp. 113-122.
The ariadne approach to web-based information integration, Craig A. Knoblock and Steven Minton. IEEE Intelligent Systems, 13(5), Sep./Oct. 1998, 4 pages.
Wrapper generation for semi-structured Internet sources, Naveen Ashish and Craig A. Knoblock. In Proceedings of the Workshop on Management of Semistructured Data, Tucson, AZ, 1997. May 13-15, 1997, 8 pages.
Wrapper induction for semistructured, web-based information sources, Ion Muslea, Steven Minton, and Craig A. Knoblock. In Proceedings of the Conference on Automated Learning and Discovery Workshop on Learning from Text and the Web, Pittsburgh, PA, 1998. Jun. 11-13, 1998, 6 pages.
Y. Zhao, "WebEntree: A Web Service Aggregator", IBM Systems Journal, vol. 37, No. 4, 1998, pp. 584-595.
Examination Report in CA Application No. 2997115, dated Jun. 20, 2019, 4 pages.
Examination Report in CA Application No. 2997115, dated Nov. 13, 2019, 8 pages.
Examination Report in CA Application No. 2997115 dated Apr. 2, 2020, 5 pages.
Examination Report in CA Application No. 2997115 dated Nov. 2, 2020, 3 pages.
Examination Report in CA Application No. 3119897 dated Jul. 30, 2021, 6 pages.
Supplementary European Search Report in EP Application No. 16844973.4, dated Jan. 4, 2019, 2 pages.
Examination Report in EP Application No. 16844973.4 dated Nov. 4, 2020, 6 pages.
Examination Report in AU Application No. 2016321166 dated Dec. 7, 2020, 5 pages.
International Search Report in PCT Application No. PCT/US2016/050536, dated Dec. 15, 2016, 8 pages.
International Search Report and Written Opinion in PCT Application No. PCT/US2021/030808, dated Jun. 21, 2021, 11 pages.
International Search Report and Written Opinion in PCT Application No. PCT/US2021/071851, dated Dec. 13, 2021, 10 pages.

* cited by examiner

Proxy Instance User A Provider 1 121

User: "User A"
Institution: "Provider 1 141"
Credentials: <User A Credentials Provider 1>
Properties: <User A Properties Provider 1>

Proxy Instance User A Provider 2 122

User: "User A"
Institution: "Provider 2 142"
Credentials: <User A Credentials Provider 2>
Properties: <User A Properties Provider 2>

Proxy Instance User B Provider 2 123

User: "User B"
Institution: "Provider 2 142"
Credentials: <User B Credentials Provider 2>
Properties: <User B Properties Provider 2>

FIG. 2

Dev Account B Proxy Instance User A Provider 1 421

Dev Account B User: "User A"
Institution: "Provider 1 141"
Credentials: <User A Credentials Provider 1>
Properties: <User A Properties Provider 1>

Dev Account B Proxy Instance User A Provider 2 422

Dev Account B User: "User A"
Institution: "Provider 2 142"
Credentials: <User A Credentials Provider 2>
Properties: <User A Properties Provider 2>

Dev Account B Proxy Instance User B Provider 2 423

Dev Account B User: "User B"
Institution: "Provider 2 142"
Credentials: <User B Credentials Provider 2>
Properties: <User B Properties Provider 2>

Dev Account A Proxy Instance User C Provider 1 424

Dev Account A User: "User C"
Institution: "Provider 1 141"
Credentials: <User C Credentials Provider 1>
Properties: <User C Properties Provider 1>

Dev Account A Proxy Instance User C Provider 2 425

Dev Account A User: "User C"
Institution: "Provider 2 142"
Credentials: <User C Credentials Provider 2>
Properties: <User C Properties Provider 2>

FIG. 4B

NEW USER WITH STATE SUBMIT

```
\curl -X POST https://bankAPI.example/auth \
  -d client_id={CLIENT_ID} \
  -d secret={SECRET} \
  -d credentials='{
   "username":"plaid_test",
   "password":"plaid_good",
   "state":"tx"}' \
  -d type={TYPE}
```

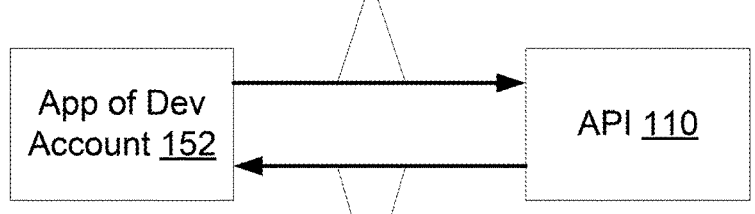

AUTH RESPONSE

```
http code 200
{"accounts": [{
  "_id": "52db1be4be13cbXXXXXXXXXX",
  "_item": "52af631671c3bdXXXXXXXXXX",
  "_user": "52af630f71c3bdXXXXXXXXXX",
  "balance": {
    "available": 1400,
    "current": 1230
  },
  "meta": {
    "name": "My Savings",
    "number": "31015"
  },
  "numbers": {
    "routing": "0000000",
    "account": "1111111",
    "wireRouting": "2222222"
  },
  "institution_type": "chase",
  "type": "depository",
  "status": "normal",
},
...], "access_token": "xxxxx"}
```

FIG. 7

NEW USER WITH STATE SUBMIT

```
\curl -X POST https://bankAPI.example/transaction \
 -d client_id={CLIENT_ID} \
 -d secret={SECRET} \
 -d transaction='{
   "withdrawal_account_token":"jasdlkfjio34i29",
   "deposit_account_token":"Bjsklaidf9djanjk",
   "amount":"515.15"}' \
 -d type={TYPE}
```

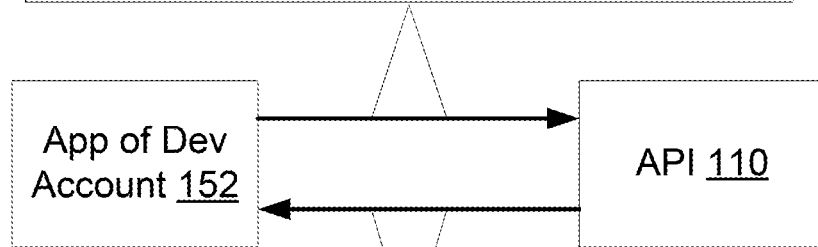

AUTH RESPONSE

```
http code 200
{"transaction": [{
  "_id": "52db1be4be13cbXXXXXXXXXX",
  "status": "processing",
},
...], "transaction_access_token": "xxxxx"}
```

Embedding Dimensionality of Tokens $\begin{bmatrix} 0.67 & 0.40 & 0.25 & 0.03 & \cdots \\ 0.66 & 0.34 & 0.97 & 0.24 & \cdots \\ 0.23 & 0.41 & 0.03 & 0.81 & \cdots \\ 0.65 & 0.57 & 0.24 & 0.24 & \cdots \end{bmatrix}$

Hidden Layer Dimensionality of Tokens $\begin{bmatrix} 0.40 & 0.68 & 0.37 & 0.72 & \cdots \\ 0.79 & 0.76 & 0.52 & 0.70 & \cdots \\ 0.32 & 0.56 & 0.04 & 0.79 & \cdots \\ 0.87 & 0.90 & 0.83 & 0.13 & \cdots \end{bmatrix}$

Fully Connected Layer Dimensionality of Tokens $\begin{bmatrix} 0.73 & 0.28 & 0.05 & 0.86 & \cdots \\ 0.91 & 0.27 & 0.81 & 0.16 & \cdots \\ 0.97 & 0.06 & 0.97 & 0.14 & \cdots \\ 0.80 & 0.24 & 0.82 & 0.85 & \cdots \end{bmatrix}$

Vocabulary Size of Tokens $\begin{bmatrix} 0.01 & 0.04 & 0.01 & 0.07 & \cdots \\ 0.08 & 0.05 & 0.09 & 0.09 & \cdots \\ 0.00 & 0.07 & 0.10 & 0.02 & \cdots \\ 0.06 & 0.10 & 0.02 & 0.03 & \cdots \end{bmatrix}$

FIG. 15D

SYSTEMS AND METHODS FOR DATA PARSING

CROSS-REFERENCE TO RELATED APPLICATIONS

This application is a continuation of U.S. Non-Provisional patent application Ser. No. 17/499,696, filed Oct. 12, 2021, which claims benefit of U.S. Provisional Patent Application No. 63/093,081, filed Oct. 16, 2020, the entire disclosure of each of which is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of present disclosure relate to systems and techniques for data parsing, and more particular, to parsing text strings included in user account data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users may grant access to their user accounts by providing credentials related to those accounts. Account data may be obtained from such user accounts. The account data may or may not be in a useful format.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to systems and techniques for data parsing. In one aspect, there is provided a method of parsing raw data associated with one or more transactions, the method comprising: receiving a text string including raw data for a transaction; matching the text string to a plurality of locations within a location corpus to extract location information from the text string; identifying a candidate entity from the text string based on a similarity score with respect to a plurality of entities within an entity corpus; in response to the similarity score of the identified candidate entity being less than a threshold score: tokenizing the text string to create a sequence of tokens; applying a masked language model to the sequence of tokens to generate a sequence of vectors, each of the vectors corresponding to one of the tokens and being encoded with information regarding one or more of the surrounding tokens in the sequence of tokens; bidirectionally parsing the sequence of vectors to identify tokens indicative of entity information; and generating entity information using the tokens indicative of entity information; and generating normalized transaction data including the extracted location information and one of the identified candidate entity or the generated entity information.

The masked language model can comprise a neural network trained based on a corpus of raw transaction data.

The bidirectional parsing can comprise applying a first long-short term memory (LSTM) neural network to the sequence of vectors in a first direction and a second LSTM neural network to the sequence of vectors in a second direction opposite to the first direction.

The similarity score can comprise a modified Jaccard similarity score.

The matching of the text string can comprise applying fuzzy string matching to the plurality of locations within the location corpus.

The sequence of vectors can comprise a sequence of multi-dimensional numerical vectors.

In another aspect, there is provided a system for parsing raw data associated with one or more transactions, the system comprising: one or more processors; and a non-transitory computer readable memory having stored thereon instructions which, when executed by the one or more processors, cause the one or more processors to: receive a text string including raw data for a transaction; match the text string to a plurality of locations within a location corpus to extract location information from the text string; identify a candidate entity from the text string based on a similarity score with respect to each entity within an entity corpus; in response to the similarity score of the identified candidate entity being less than a threshold score: tokenize the text string to create a sequence of tokens; apply a masked language model to the sequence of tokens to generate a sequence of vectors, each of the vectors corresponding to one of the tokens and being encoded with information regarding one or more of the surrounding tokens in the sequence of tokens; bidirectionally parse the sequence of vectors to identify tokens indicative of entity information; and generate entity information using the tokens indicative of entity information; and generate normalized transaction data including the extracted location information and one of the identified candidate entity or the generated entity information.

Various combinations of the above and below recited features, embodiments, and aspects are also disclosed and contemplated by the present disclosure.

Additional embodiments of the disclosure are described below in reference to the below example clauses and the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2 illustrates aspects of some example proxy instances, according to an embodiment;

FIG. 4B illustrates aspects of some example proxy instances, according to an embodiment;

FIGS. 7-8 illustrate examples of API request and response flows of the system, according to an embodiment;

FIGS. 15A-15D illustrate 2D matrices which include sequences of vectors at various stages of processing by the masked language model in accordance with aspects of this disclosure.

DETAILED DESCRIPTION

Figure 1:
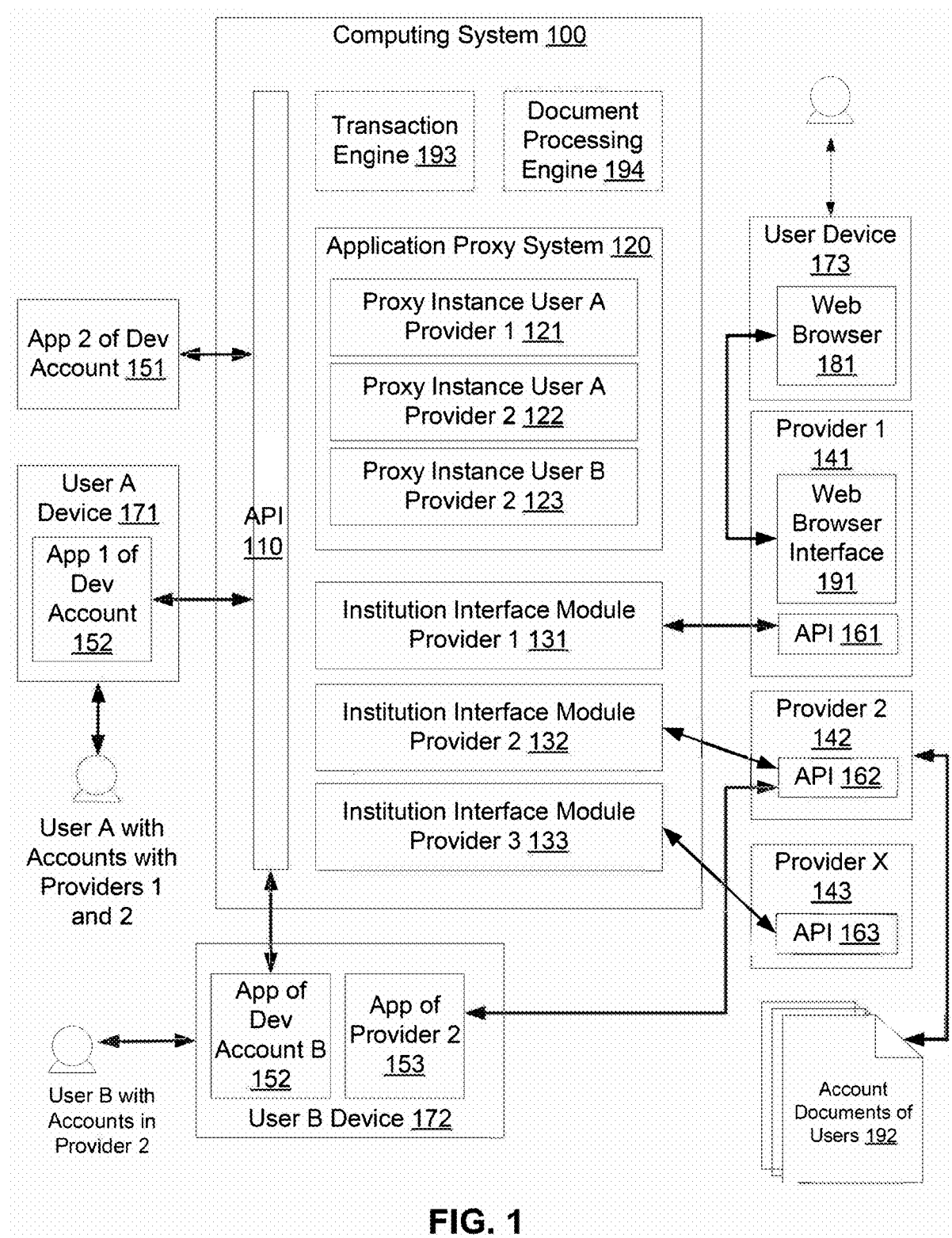
FIG. 1 is a block diagram illustrating various aspects of a computing system and network environment in which the computing system may be implemented, according to an embodiment.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments, disclosed herein are systems and techniques for parsing user account data (which may include transactions, also referred to as "transaction descriptions") to provide normalized user account data, which can include location information and entity information in a standardized format. In some implementations, the entity may be a merchant associated with the transaction description.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Definitions

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

Permissions Management System (also referred to herein as "the system"): A computing system, the functionality of which is described in detail in the present disclosure. Functions of the permissions management system (which are described in further detail below) include, but are not limited to: accessing and/or extracting user account data from external user account systems (e.g., recurring transfer account systems, payroll or other service provider account systems, etc.); initiating execution of, or executing, transactions via external user account systems; generating secure electronic records and tokens (e.g., unique identifiers associated with the electronic records) based on user account data; enabling permissioning of access to, and execution of changes to or transactions on, user accounts on the user account systems; enabling revocation of permissions for, or de-authorization of, access to user accounts on the user account systems; and/or enabling revocation of permissions for, or de-authorization of, rights to execute transactions or changes via user accounts on the user account systems. One or more of these functionalities may be implemented via the permissions management system, as described below, and may be accessible to customers via an application programming interface (API). Accordingly, a customer may access any of the functionality of the permissions management system (including, e.g., accessing user account data, permissioning access to user account data, etc.), via the API.

External User Account System: A computing system or service of an external institution. For ease of description, general references herein to external institutions (or more simply "institutions") may be understood to refer to the external user account systems of those institutions. Accordingly, external user account systems may also be referred to herein as "external institution system," "external bank systems," "bank systems," "banks," "institutions," "external services," "payroll systems," "payroll providers," and/or the like. As described below, external user account systems may provide public and/or non-public (e.g., proprietary) application programming interfaces (APIs) by which user account data may be accessed by first-party software applications (e.g., mobile device software applications) of the external institutions. However, as further described below, the system of the present disclosure may enable access to service provider user account data via such public/non-public APIs of the external user account systems by, e.g., instantiating virtual and/or proxy instances of the first-party software applications of the external institutions. External user accounts may also be referred to herein as "user accounts."

External Institution: An entity that maintains a user account. Examples of external institutions (also referred to herein as "institutions") include, but are not limited to, banks, credit card providers, investment services, loan providers, and/or other suitable financial institutions or user account holding institutions.

Application Programming Interface (API): A set of routines, protocols, and/or tools for building a software application. Generally, an API defines a standardized set of operations, inputs, outputs, and underlying types, such that functionality is accessible via the API in an efficient way. The system provides an API by which a customer may access any of the functionality of the system, as described herein. Accordingly, the system advantageously abstracts away (from a customer's perspective), much of the complexity that may be involved in the functionality of the system, and enables the customer to quickly and efficiently leverage the functionality of the system to build other systems and services.

Customer: One who makes use of the API of the system to access functionality of the system in a software application of the customer, as described herein. Customers of the system may include, but are not limited to, software developers (who may be developing, e.g., a software application such as a store, or mobile app), third-party processors (e.g., third-party payment processors), external institutions, merchants, and/or the like.

External User-Facing System/Application: A software application and/or computing system of a customer (e.g., developed by a customer) that interacts with the system via the API of the system. Examples of external user-facing systems/applications include, but are not limited to, desktop software applications, mobile device software applications, server software applications, and/or the like. In general, external user-facing systems/applications provide goods or services to a user. In some instances, for ease of description, such software applications may be referred to herein as "apps." Additionally, external user-facing systems/applications may also be referred to herein as "developer systems," "developer computing devices," and/or the like. Examples of external user-facing systems/applications include apps for payment processing, payroll direct deposit switches/customizations, account data review/analysis, budgeting, account monitoring, providing recommendations for savings, etc.

Third-Party Processor: An entity that processes transactions, e.g., financial transactions for a merchant. When provided with account information (e.g., credit/debit card information, bank account information, payroll account information, etc.), direct deposit information, and payment information (e.g., how much to pay, to whom, and when, etc.), executes and processes a transaction. In some implementations, the system may interact with one or more third-party processor systems to execute and/or process payments. Alternatively, the system may include functionality to process transactions, and thus may effectively act as its own "third-party" processor (thus, "third-party" is somewhat of a misnomer in this context, but the term "third-party" is used in the present disclosure for clarity purposes). Third-party processors may be referred to herein as "trusted" third-party processors, because in some implementations the third-party processor is entrusted with user account data that, for example, an external user-facing system/application is not. Third-party processors may be referred to herein as "third-party transaction processors." As used herein, the term "transactions" may include any of various types of activities related to accounts, including but not limited to: financial transactions (e.g., ACH transfers, credit card transactions, debit card transactions, other types of payments or money transfers, etc.), updating account information, setting up alerts, etc. The system may additionally enable various other types of activities (e.g., updating account information, requesting services, etc.) that in some instances may be referred to herein as executing transactions, and/or the like.

User: A holder of a user account at an external institution. In general, a user maintains account credentials for accessing their user account, and provides authorizations and/or de-authorizations for an external user-facing system/application of a customer (e.g., an "app" of a developer) to limitedly and securely access the user account (e.g., to initiate payments for goods or services). Such authorizations and/or de-authorizations (among other functionality) are enabled by the system and via the API of the system, as described herein. Advantageously, according to some embodiments, the user's account credentials are never accessible to the external user-facing system/application. Rather, the system may securely enable the user to indicate authorizations and/or de-authorizations, without revealing the account credentials outside of the system (and/or trusted entities of the system, such as a trusted third-party processor).

User Input (also referred to as "input."): A person's (e.g., a user or customer) interactions with a computing system, such as any type of input provided by a user/customer that is intended to be received and/or stored by the system, to cause an update to data that is displayed and/or stored by the system, to cause an update to the way that data is displayed and/or stored by the system, and/or the like. Non-limiting examples of such user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

III. Example Systems and Methods for Programmatically Accessing User Account Data FIG. 1 illustrates certain aspects of a computing system 100 (e.g., the system) that may access user account data from one or more external account systems, e.g., configured to assist with deposits, payroll, recurring transfers generally, bank accounts (e.g., savings and checking) and transactions, and credit card accounts and transactions. The system 100 may include an application programming interface (API) service 110, an application proxy system 120, and at least one institution interface module (e.g., modules 131, 132, and 133). The system functions to provide programmatic access to one or more external user account systems (e.g., external user account systems 141, 142, and 143) that lack exposed programmatic access. The external user account systems may comprise proprietary and external financial services (e.g., financial institution services, among others, as described above). Such institutions may have first party software applications (e.g., mobile applications) that enable users to access user account data/information from a mobile or desktop device. Such first party applications commonly use proprietary or customized API (e.g., APIs 161, 162, and 163). These APIs are commonly not public and not exposed. For example, a developer is commonly prevented from registering an account and using an open API authentication approach to arbitrarily access the API resources of such external user account systems. Additionally, the APIs (e.g., APIs 161, 162, and 163) of the external user account systems may include non-trivial customized interface protocols that may not be shared with other institutions; e.g., each external user account system conforms to its own interface.

The system 100 functions to provide a normalized interface (e.g., API service 110) to the one or more external user account systems (e.g., external user account systems 141, 142, and 143). The system 100 enables access to a user account within an external user account system by leveraging the application proxy system 120. A virtualized "image" or digital simulation of an application instance is maintained in the application proxy system 120 and used to access the unexposed API (e.g., APIs 161, 162, and 163) of the external user account system. While the system may be applied to service providers/institutions (e.g., banks, credit card companies, payroll providers, etc.), the system may additionally or alternatively be applied to providing API access to other external systems with closed or limited API access.

The API 110 of the system functions to provide a normalized customer facing interface. The API 110 may be normalized in the sense that the underlying non-public (or public) API to the external user account system (e.g., external user account systems 141, 142, and 143) that acts as the source of the user account data is abstracted away, and the API 110 to various different external user account systems is substantially standardized. In some variations, various aspects of the API 110 may be limited when interfacing with external user account systems. For example, one institution may not support a feature such as digital check deposit, while a second institution does. In this case, the API 110 may define the API such that the API feature for check deposit is prevented for the first institution. The system 100, and more specifically the API 110, may be used to provide an accessible API service to customers, e.g., outside developers. As such, the system 100 may be a multi-tenant system that allows numerous accounts to share use of the system 100. The system 100 and more particularly the API 110 may alternatively be a single tenant system. For example, the system 100 may be used as an internal system to a website providing an online financial management or payroll product.

The API service 110 may be a RESTful API, but may alternatively be any suitable API such as SOAP or custom protocol. The RESTful API works according to an HTTP request and response model. HTTP requests (or any suitable request communication) to the system 100 may observe the principles of a RESTful design. RESTful is understood in this document to describe a Representational State Transfer architecture as is known in the art. The RESTful HTTP requests may be stateless, thus each message communicated contains all necessary information for processing the request and generating a response. The API service 110 can include various resources which act as endpoints which act as a mechanism for specifying requested information or requesting particular actions. The resources can be expressed as URI's or resource paths. The RESTful API resources can additionally be responsive to different types of HTTP methods such as GET, PUT, POST and/or DELETE.

The API service 110 can provide an interface into a variety of information and action resources, as provided by the system 100. Information/data relating to a user account may be accessible through querying particular API resources via the API 110. For example, a list of transactions and information about each individual transaction may be accessible through different API calls of the API 110. Information can additionally relate to account summary information, account details such as address and contact information, information about other parties such as the entities involved in a transaction, and/or any suitable information. The API 110 may additionally be used to trigger or facilitate performing some action. For example, an API call may be used in transferring money, updating account information, setting up direct deposits, or performing any suitable action. Those skilled in the art will appreciate that such example API features that any suitable API feature possibilities and semantic architecture may be used.

In one example implementation, an API call via the API 110 can support adding a bank or payroll deposit recipient, completing authentication, accessing transaction information, and other actions. For example, an application may POST to a "/connect" REST API resource of the API 110 to authenticate a user; if an institution includes multi-factor authentication, then a "/connect/step" resource can be submitted to complete multi-factor authentication credentials; and then performing a GET on the "/connect" resource can access transactional data related to the user/user's account. The API 110 may additionally include informational resources to access information about entities involved in transactions. For example, the API 110 may allow a particular business resource to be accessed to obtain contextual information about the business such as name, location, and classification.

The application proxy system 120 functions to manage a simulation of a first-party software application access to an institution. The application proxy system 120 operates in cooperation with one or more institution interface modules (e.g., institution interface modules 131, 132, and 133) to establish a data model and/or a data image that acts as a virtualized or simulated application instance (also referred to herein as an "application proxy instance," "proxy instance," "virtualized instance," "simulated instance," and/or the like) (e.g., proxy instances 121, 122, and 123). From the perspective of the institution, the proxy instance (e.g., proxy instances 121, 122, and 123) appears as a first-party application (e.g., Provider 2 application 153) installed on a physical user device (e.g., user devices 171 and 172) that is being used by a user. In other words, the requests received from the proxy instance are treated like requests from a first-party mobile app, desktop app, or web-based application of the user. The application proxy system 120 may store and maintain a plurality of application proxy instances (e.g., proxy instances 121, 122, and 123). The proxy instances may include configuration settings and properties that, when used according to a defined institution interface (e.g., an institution interface of an institution interface module 131, 132, and/or 133), will appear as requests from first-party applications (e.g., application 153) of the institution (e.g., institution 141, 142, and/or 143). A different proxy instance may be created and maintained for each user account-institution pair. A given user may have multiple user accounts with different providers/institutions. A proxy instance may include a set of properties that can be used to authenticate the proxy instance with the institution system (e.g., institution 141, 142, and/or 143). The application proxy system 120 provides a method to programmatically create a proxy instance for a user. The user may provide some account credentials that can be used in an initial registration of the proxy instance with the non-public or public API of the institution. The proxy instance may be characterized as a set of properties that can be stored and maintained. Some of those properties may be automatically generated, may be provided from the institution during negotiating registration, may be properties of the application that is being simulated, and/or may include any suitable identifying and authenticating information. The properties may include or be based on a unique user identifier code/fingerprint, an authentication token, a MAC address (e.g., a MAC address of a user device 171 or 172), or any suitable information. When a request is made to a service provider or institution on behalf of a user, the properties of the proxy instance may be invoked to gain access to the institution on behalf of the associated user.

FIG. 2 depicts example proxy instances 121, 122, and 123 of FIG. 1. As shown in FIG. 2, User A has accounts with Service Provider 1 and Service Provider 2, and User B has accounts with Service Provider 2. As shown in FIG. 2, each proxy instance includes account credentials and properties.

An institution interface module (e.g., one of institution interface modules 131, 132, or 133) functions to model the internal interface (e.g., interaction with one of APIs 161, 162, or 163) of at least one application (e.g., the application 153) with an external institution (e.g., one of institutions 141, 142, or 143). An institution interface module may be established for each institution with which the system 100 can interface. For example, an institution interface module may exist for each service provider/institution is available in the system. The institution interface module may include a set of rules and processes of a particular institution. The institution interface module may include a proxy sub-module that defines how the institution recognizes and/or authenticates a particular application. Some service providers/institutions may depend on the MAC address of a device (e.g., a MAC address of user devices 171 and/or 172), some may depend on asymmetric cryptography tokens, and others may generate encrypted tokens. The proxy sub-module is used in establishing the proxy instance information. The institution interface module can additionally include institution protocol sub-module, which defines a mapping between provided API 110 functionality and the form and mode of communication with the external institution (e.g., institutions 141, 142, or 143). The institution protocol sub-module can define the headers, body, and other properties of messages sent to the associated institution. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of interacting with an interface (e.g., APIs 161, 162, and/or 163) of an external institution (e.g., institutions 141, 142, and/or 143) may additionally be built into the institution interface module such as multi-factor authentication rules.

An institution interface module may be constructed based on use of an actual first-party application (e.g., the application 153). For example, communication of, and/or source code of, the first-party application can be parsed and analyzed to establish some or all of an institution interface module. In some implementations, source code of a first-party application (e.g., the application 153) of an external institution is parsed and analyzed to establish some or all of an institution interface module for the external institution. In some implementations, communication between an external institution and a first-party application (e.g. the application 153) of the external institution is parsed and analyzed to establish some or all of an institution interface module for the external institution.

Figure 3:
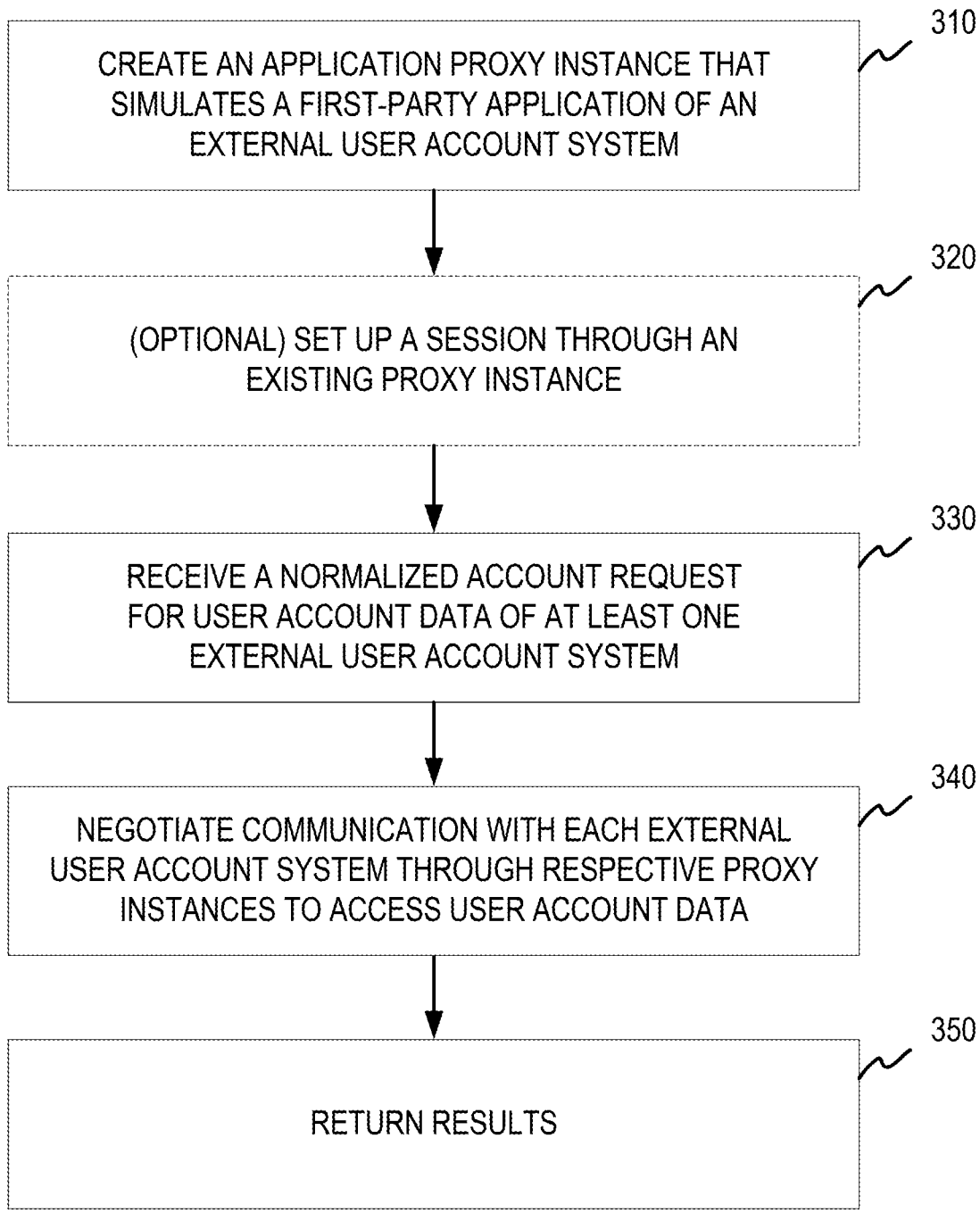
FIG. 3 is a flowchart illustrating an example method of accessing user account data, according to an embodiment.

FIG. 3 is a flowchart illustrating an example method of accessing user account data, according to an embodiment. As shown in FIG. 3, the method can include creating an application proxy instance (block 310), optionally setting up a communication session through the proxy instance (block 320), receiving a normalized account request (block 330), negotiating communication with an external interface through a proxy instance (block 340), and returning results (block 350). The method functions to provide programmatic access to one or more external services (e.g., external user account systems of external institutions) that lack exposed programmatic access. The external services may be proprietary and/or non-public. The external services can be provided by external institutions, as described above. Such institutions may have first-party applications that enable users to access user account information via a mobile or desktop application. Such first-party applications may use a proprietary or customized API (e.g., API 161, 162, and/or 163) of the external institution. Such APIs are commonly not public and not exposed. For example, a developer is commonly prevented from registering an account and using an open API authentication approach to arbitrarily access the API resources of external institutions. Additionally, such APIs are non-trivial customized interface protocols that are not shared with other institutions, e.g., each institution conforms to its own interface. The method can additionally provide a normalized interface to a plurality of external services (e.g., external institutions 141, 142, and/or 143). The method enables a programmatic interface into an account within an institution by leveraging an application proxy approach. A virtualized "image" or digital simulation of an application instance is maintained in the application proxy system 120 and used to access the unexposed API (e.g., API 161, 162, and/or 163) of the institution. The system 100 may be applied to payroll providers/institutions, the system 100 may additionally or alternatively be applied to providing API access to any other external entities with closed or limited API access. The method may be implemented through the system 100 as described above, but may alternatively be implemented by any suitable system.

At block 310, which includes creating an application proxy instance (e.g., an application proxy instance 121, 122, and/or 123), the system 100 functions to establish a digital image of a first-party application instance (e.g., the application instance 153) for a selected institution (e.g., the Payroll Provider 2 142). Creating application proxy instances may be initiated in response to receiving an initial request. The initial request may be initiated by a user (or entity) (e.g., User A or User B) interacting with an external user-facing system/application (e.g., application instances 151 and/or 152, executing on either of user devices 171 or 172 and/or another suitable device, and/or further executing on another system of the application instances 151, 152) of a customer (e.g., a developer). The external user-facing system/application may then send the initial request to the system 100. The user (e.g., User A and/or User B) may have a user account with the external institution (e.g., an online payroll provider account). An application proxy instance (e.g., one of proxy instances 121, 122, and/or 123) can be created during the initial registration or at a later time, which will provide access to account information of the external institution. Once created, the application proxy instance of that user can be persisted and used at a later time for that given user-institution combination (e.g., "User A—Service Provider 1", "User A—Service Provider 2", "User B—Service Provider 2"). However, a new proxy instance may be created when the proxy instance becomes invalid (e.g., as a result of institution API changes, password/login changes made within the institution, and/or other changes to invalidate a proxy instance). The initial request may be received through a normalized API (e.g., API 110) as a connection request. The connection request may be accompanied by parameters that specify a selected institution (if there are multiple institution options) and user credentials for the institution. The user credentials may include a username, password, pin code, and/or any suitable credentials. The API request may additionally include authentication credentials such as a client identifier and secret token that is associated with the account in the system.

Creating a proxy instance may include negotiating registration of the proxy instance with the institution, which functions to establish the proxy instance with the selected external institution. An institution interface module (e.g., one of the modules 131, 132, or 133) may facilitate navigating the communication handshaking during the initial login. Different institutions may have different processes to register or enroll a new application (which in the method is a proxy instance) such as multi-factor authentication. During the negotiation, various elements may be extracted and stored as part of the proxy instance. Similarly, some properties may be generated based on communication with the institution. For example, a MAC address or a unique device identifier may be used in connecting to the services of the external institution. Such properties may be stored as part of the proxy instance.

As mentioned above, multifactor authentication (MFA) may be part of negotiating with an external institution. For example, an external institution may respond with indication of an MFA credential requirement. Such MFA requirements may be fulfilled by relaying the MFA challenge/task up to a user. In one implementation, the system 100 receives a message indicating that a security question should be asked to complete the negotiation. The security question is passed back to the associated application (e.g., applications 151 and/or 152, which may be operated by a customer/developer account of the system 100). Then, the associated application may present the security question in some manner to obtain the user response. The MFA can include security questions, additional pin codes (such as those supplied by a one-time password generator or a code transmitted to a secondary device), or any suitable form of MFA.

At block 330, the system receives a normalized account request via the API 110 of the system 100. As mentioned above, the syntax and mode of communicating an API request is normalized such that the format is independent of the institution. The requests can include a variety of types of requests which may include: obtaining a list of transactions; requesting details on a particular transaction; performing some financial transfer (moving money from savings to checking, setting up transfer to another account, making scheduled payments, digital deposit of a check, and/or the like), updating account information (e.g., updating contact information, changing password, manage alerts, and/or the like), requesting services (e.g., new cards, reporting fraud, and/or the like), and/or the like. A normalized account request may be mapped to an institution interface module (e.g., one of the institution interface modules 131, 132, or 133) or other suitable component that defines communication to fulfill the API request.

At block 340, which includes negotiating communication with an external interface (e.g., one of APIs 161, 162, and/or 163) through a proxy instance (e.g., one of the proxy instances 121, 122, and/or 123), the system 100 functions to execute and manage communication between the system and an external institution system (e.g., one of systems 141, 142, and/or 143) when fulfilling an account request. The proxy instance (e.g., one of the proxy instances 121, 122, and/or 123) provides a mechanism through which access may be granted. The communication is executed while an authenticated session is active. Communication sessions may be expired by the system 100 or the external institution for various reasons, such as remaining inactive for a set amount of time. A communication session may be active subsequent to enrolling a proxy instance or may require setting up a session through the proxy instance as described below.

Negotiating communication may include creating requests that conform to expected messages of the external institution. This can include setting headers, body contents, and other message properties. An institution may expect particular headers. For example, the headers may include a host or path, a data, content type, cookies, MAC address, a user identifier, authorization properties, and/or other suitable headers. Creating requests can additionally include transforming request properties into an expected form, which may include applying a set encryption pattern to a request. In one variation, transforming the request involves encrypting content according to a public key, wherein the public key may be stored as part of the proxy instance. The institutions may take varying approaches to how information is communicated. In an alternative institution, the contents of a message may be unencrypted, in which case, the contents may be submitted in a plaintext, unencrypted form. In addition to creating requests that conform to expected messages of the external institution, the method can include following a request-response pattern. That pattern can involve a single request and response, but may alternatively include a sequence of different request and responses to obtain desired information.

In some variations, information or actions may not be available through the first proxy instance and so the method may include automatically switching to a second proxy instance with supported functionality. For example, full pay or bank statements may not be available in a mobile application, and the institution API (e.g., one of APIs 161, 162, and/or 163) may not include such functionality. Accordingly, when that functionality is required to fulfill an API request of the API 110, then a second proxy interface may be used. In some variations, an API request via the API 110 may require multiple institutions to be queried. Such an API request may be particularly useful for summarizing financial statements across multiple accounts. The method can include negotiating communication for multiple institutions and combining results into a combined form.

At block 350, which includes returning results, the system 100 functions to deliver the results as a response to the request. Returning the results includes transforming the data obtained from the external institution into a normalized form. The information is formatted into a standardized format that is substantially similar in representation between different institutions served by the system 100. Transforming the data can additionally include processing, supplementing, and/or otherwise enhancing information. Some information provided by an institution may be poorly formed. For example, store information for a particular transaction may be poorly labeled and may be represented different from other institutions. Such contextual information about external entities can be cleaned and/or supplemented with additional information. For example, an entity may be supplemented with categorical labels, tags, geolocation information, and/or other suitable information. The returned results can be represented data format such as JSON, XML, or any suitable format.

The method can additionally optionally include block 320, which includes setting up a session through a proxy instance that was previously created, and functions to facilitate accessing information after negotiating a proxy instance for an account and institution. The proxy instance may store and maintain information required for subsequent access. The external institutions may restrict access to set sessions, which may expire after some amount of time or may require reconfirming user credentials. Thus, when an API request for an account occurs after a communication session has expired, then the method may automatically set up a new session using the previous user credentials and proxy instance credentials. In some variations, MFA challenges, such as security questions, may be automatically completed.

The method can additionally include re-capturing updated credentials, which functions to update user credentials for an institution. Updated credentials may be updated when a user changes them within the institution or when the proxy instance is otherwise locked out of the account. An error may occur indicating that a communication session was not successful, and then an API request can be submitted to update a proxy instance with new credentials.

Referring again to FIG. 1, in some implementations, the external user account system of the external institutions may include public web browser interfaces. For example, as shown in FIG. 1, the Service Provider 1 system 141 may include a web browser interface 191 for accessing the Service Provider 1 system 141 via a web browser (or any suitable web client) (e.g., web browser 181 of the user device 173). As described herein and further below in reference to FIGS. 6 and 7, the system 100 provides access to the user account data via private, proprietary APIs (e.g., API 161) of external institutions, as opposed to access via a public web browser interface 191. In some implementations, the web browser interface 191 is a web server that hosts a web site for access of the external institution system via a web browser over the Internet.

Figure 4A:
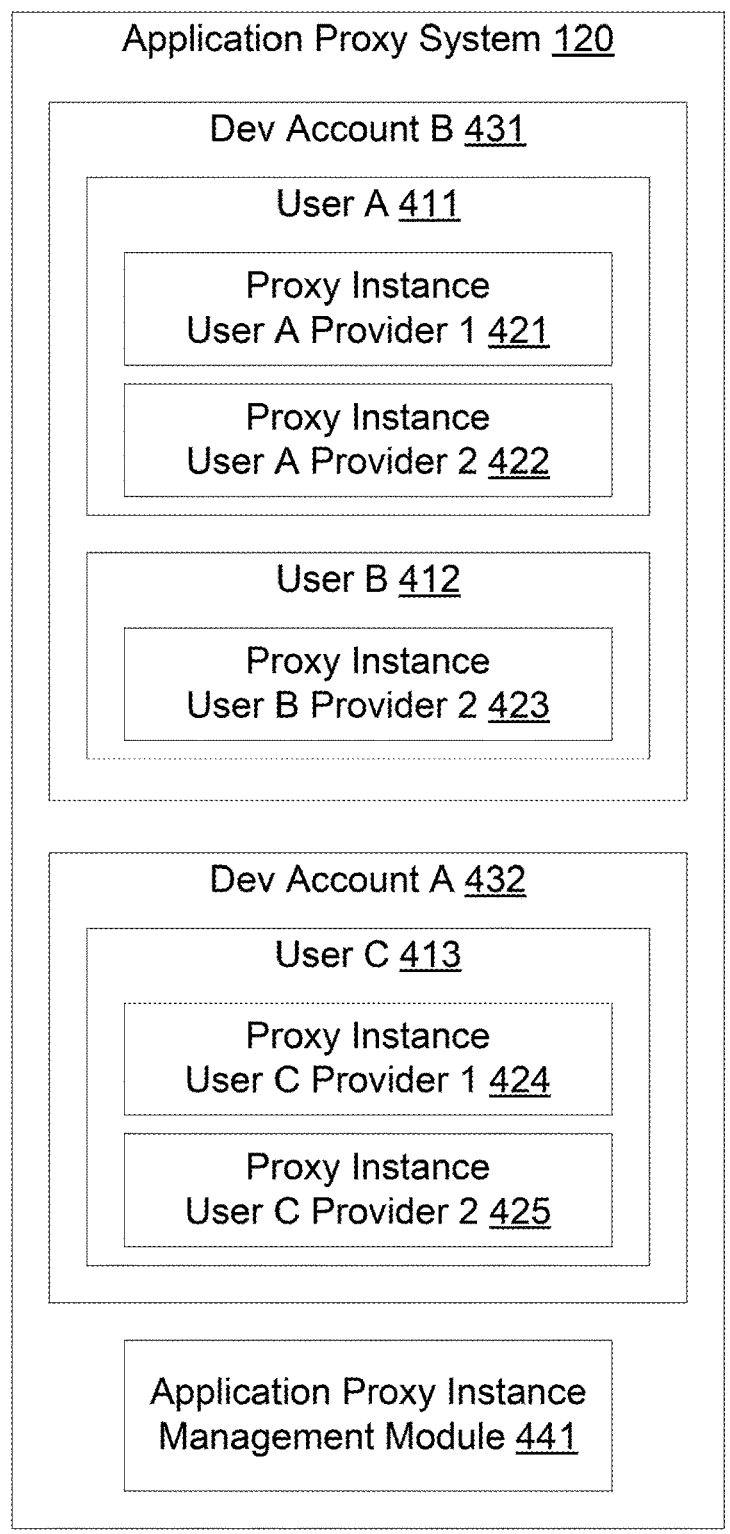
FIG. 4A illustrates aspects of an application proxy system, according to an embodiment.

FIG. 4A illustrates aspects of the application proxy system 120, according to an embodiment. As shown in FIG. 4A, the application proxy system 120 includes application proxy instances (e.g., proxy instances 421, 422, 423, 424, and 425) for user accounts (e.g., user accounts 411, 412 and 413) of developer accounts (e.g., Dev Account B 431 and Dev Account A 432) at the system 100. The application proxy system 120 includes an application proxy instance management module 441 that is constructed to generate application proxy instances, configure application proxy instances, remove application proxy instances, and/or the like.

In some implementations, each application proxy instance (e.g., proxy instances 421, 422, 423, 424, and/or 425), specifies a developer account, a user account of the developer account, an associated external user account system (e.g., an external institution), and credentials of the user account for the external institution, as shown in FIG. 4B. In some implementations, each application proxy instance specifies properties of the application proxy instance. In some implementations, properties include one or more of a unique user identifier code, an authentication token, a MAC address (e.g., a MAC address of a user device 171 and/or 172), or any suitable information.

In some implementations, the application proxy instance management module 441 creates the application proxy instance responsive to a request to create an application proxy instance. In some implementations, the request to create an application proxy instance specifies information identifying an external user account system, and a user account of an external user-facing system/application (e.g., a user account of the external user-facing system/application 152 of FIG. 1). In some implementations, the request to create an application proxy instance specifies user credentials for the external user account system. In some implementations, the request to create an application proxy instance specifies information identifying an account of the system 100 associated with the external user-facing systems/application. In some implementations, the request to create an application proxy instance specifies properties for the application proxy instance. In some implementations, properties for the application proxy instance include at least one of a unique user identifier code, an authentication token, a MAC address, user accounts of the corresponding external user account system, and/or any other suitable information.

In some implementations, the application proxy instance management module 441 stores the created application proxy instance in association with a user account (e.g., "User A" 411 of FIGS. 4A and 4B) of an external user-facing system/application (e.g., a user account of the external user-facing system/application 152 of FIG. 1). In some implementations, the application proxy instance management module 441 stores the created application proxy instance in association with an account (e.g., "Dev Account B" 431 of FIGS. 4A and 4B) of the system 100 associated with an external user-facing system/application (e.g., a user account of the external user-facing system/application 152 of FIG. 1). In some implementations, the application proxy instance management module 441 stores the created application proxy instance (e.g., "Proxy Instance User A Service Provider 1" 421 of FIGS. 4A and 4B) in association with an account (e.g., "Dev Account B" 431) of the system 100 associated with an external user-facing systems/application, and a user account (e.g., "User A" 411) of the external user-facing systems/application. In some implementations, the application proxy instance management module 441 stores the created application proxy instance in association with an account of the system 100 associated with an external user-facing systems/application, a user account of the external user-facing systems/application, and information identifying the external user account system (e.g., "Service Provider 1 141" of FIG. 4B) of the application proxy instance. In some implementations, the application proxy instance management module 441 stores the created application proxy instance in association with an account of the system 100 associated with an external user-facing systems/application, a user account of the external user-facing systems/application, information identifying the external user account system of the application proxy instance, and information identifying user accounts of the application proxy instance.

In some implementations, creating the application proxy instance includes controlling the application proxy instance management module 441 to construct the application proxy instance to simulate communication, register, negotiate registration, and/or the like, of an application (e.g., application 153 of FIG. 1) (of the external user account system of the application proxy instance) with the external user account system on behalf of the user account (e.g., "User A", "User B") of the application system.

Additional examples and details of accessing user account data via proxy instances of the system may be found in U.S. patent application Ser. No. 14/790,840, filed Jul. 2, 2015, and titled "SYSTEM AND METHOD FOR PROGRAMMATICALLY ACCESSING FINANCIAL DATA" (referred to herein as "the '840 application"). The entire disclosure of this application is hereby made part of this specification as if set forth fully herein and incorporated by reference for all purposes, for all that it contains.

As mentioned above, the system 100 may also be used, via the API 110, to access various types of user account data, including documents (such as statements). The system 100 may also be used, via the API 110, to initiate transactions (such as a transfer of funds between accounts, schedule payments, etc.). The system 100 may also be used, via the API 110, to update account information or request services. Additional examples and details of such functionality of the system is provided below, and may also be found in the '840 application.

IV. Example Systems and Methods for
Programmatically Verifying Transactions

Figure 5:
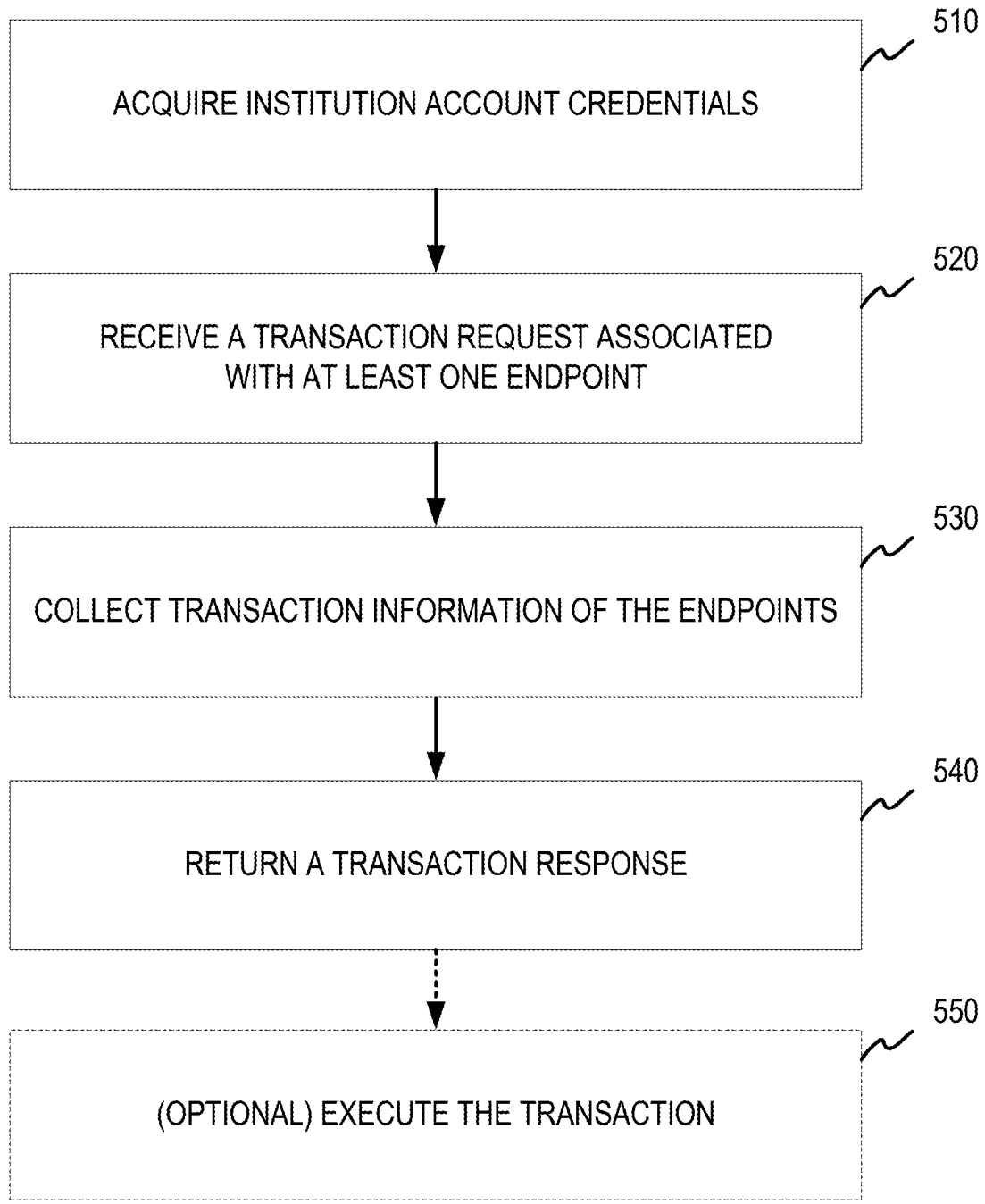
FIG. 5 is a flowchart illustrating an example method of processing transactions, according to an embodiment.

FIG. 5 is a flowchart illustrating an example method of processing transactions, according to an embodiment. As shown in FIG. 5, the method can include acquiring user account (also referred to herein as "institution account") credentials (block 510), receiving a transaction request (e.g., direct deposit switches, updates, or changes) associated with at least one endpoint (block 520), collecting transaction information of the endpoint (block 530), and returning a transaction response (block 540). In some embodiments, the method can optionally include executing the transaction (block 550), which functions to process the transaction between two endpoints. In some embodiments, the method does not perform execution of the transaction, receiving the transaction request functions to initiate the retrieval of transaction addressing information of the at least one endpoint, collecting transaction information of the endpoint includes collecting transaction addressing information of the endpoint, and returning a transaction response functions to transmit the collected transaction addressing information of the endpoint. The method functions to leverage account access during the transaction process. Variations of the method can be used to add functionality such as verifying account information used in financial transfers, programmatically transferring funds, setting programmatic events, catching errors and fraud, performing conditional processing of a transaction, and/or other suitable operations. The method may be performed by the system 100. In some implementations, the transactions are automated clearing house (ACH) transactions, but any suitable type of transaction may be used. In a first implementation, the method enables a customer/developer, via the API 110, to obtain verified ACH endpoint information. For example, an account number and a routing number may be obtained, as well as verification of ownership of the account. In this variation, the system 100 provides the information to execute the transaction. In another embodiment, the method additionally executes the transaction having obtained the required information and verification. The method of FIG. 5 may be implemented by the system 100, but the method may alternatively be implemented by any suitable system.

Figure 6:
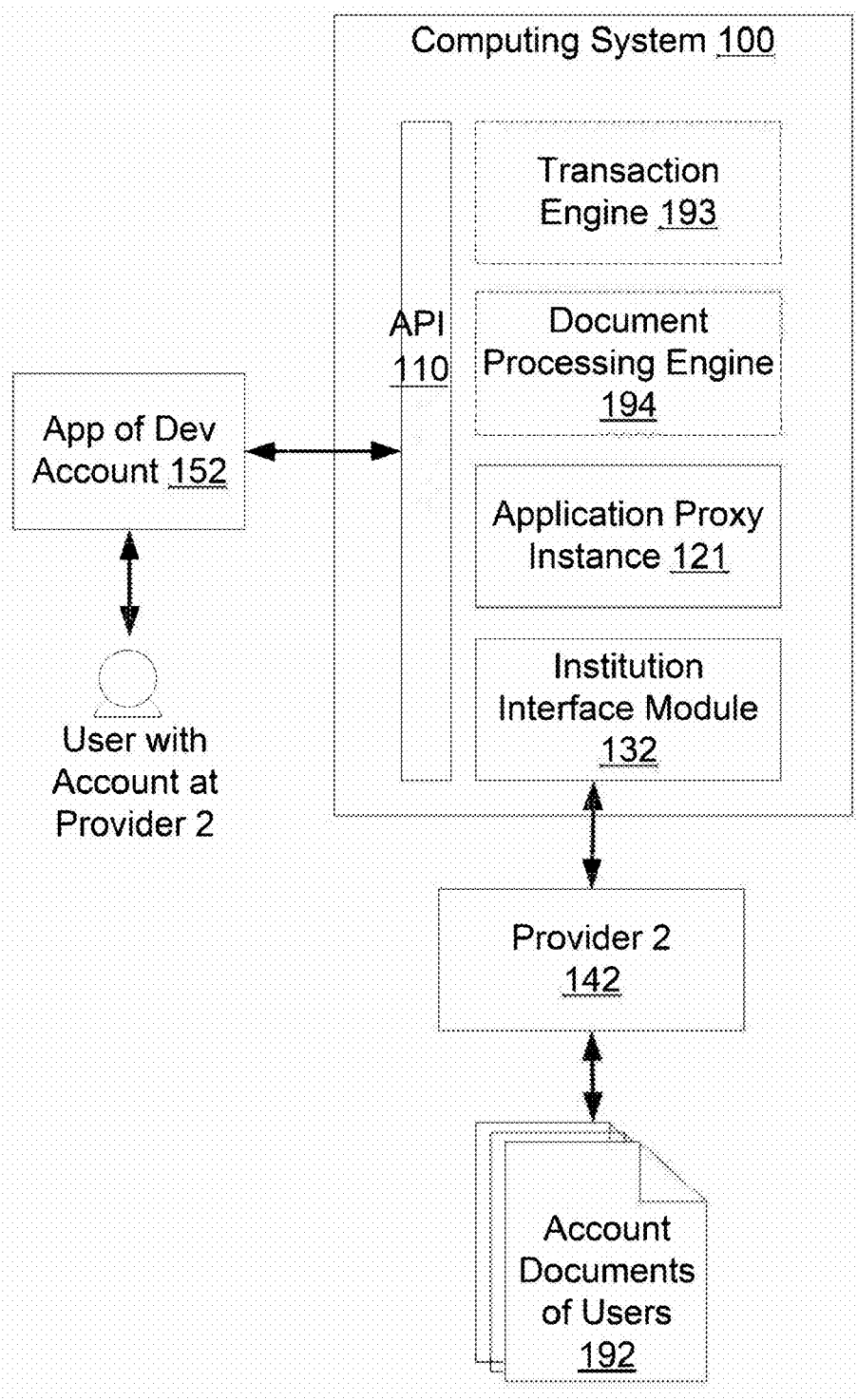
FIG. 6 is a simplified block diagram of the computing system and network environment of FIG. 1, according to an embodiment.

FIG. 6 is a simplified block diagram of the computing system and network environment of FIG. 1, according to an embodiment. The method of FIG. 5 is described below in reference to certain aspects of FIG. 6 (or, alternatively, FIG. 1)

At block 510, which includes acquiring institution account credentials, the system 100 functions to obtain login information for an institution (e.g., the service provider/institution 142). The institution account credentials may include a username and password. The account may be an account of an external institution. Additionally, an institution may include additionally authentication challenges such as a pin code, security questions, single-use passwords, secondary device code verification, biometric identification, and/or any suitable form of multi-factor authentication (MFA), as described above. Such additional authentication challenges may be collected at the same time of the account credentials, but the MFA authentication process may alternatively be defined in the API protocol. For example, if the primary account credentials are not sufficient, the MFA challenge may be returned in a response, this additional credential request can be repeated as required before access to the account is obtained. The institution account credentials can additionally be stored, and automatically used to complete subsequent access or login attempts.

The account credentials may be provided through an API request of a customer/developer or application of the customer/developer to the API 110. The API 110 may be used in establishing, setting up, or enrolling a new user account. One user may have at least one associated user account at an external institution, but may be linked or associated with multiple user accounts at multiple external institutions. Account credentials may be obtained for each user account.

At block 520, which includes receiving a transaction request associated with at least one endpoint, the system 100 functions to initiate the retrieval of transaction addressing information of an endpoint. The endpoint may be a transaction endpoint, which may be any suitable endpoint from which funds may be withdrawn or deposited. In a common transaction, there is a single withdrawal account and a single deposit account. The method can be used in obtaining information for one or more endpoints. In some variations, there may be a plurality of withdrawal and/or deposit accounts. In one variation, the transaction request is identical to an enroll user request used to obtain the user credentials of block 510. The account credentials may alternatively be previously obtained or obtained in response to the transaction request.

In one variation, in which the transaction request is for information about an account, the API request may specify an institution and account credentials. Additional credentials may additionally be required such as a pin code, state in which an account was created, or MFA challenge answers. A second request with similar parameters may be submitted to obtain the account credentials for other involved transaction endpoints.

In another variation, the transaction request may explicitly define the transaction details. The transaction request may include at least one withdrawal account endpoint and deposit account endpoint. Account credentials may be specified for each endpoint. In one variation, a single API request may include account credentials for both endpoints. In another variation, a transaction resource is used, such that withdrawal endpoint information, deposit account information, and transaction details can be specified asynchronous. For example, a transaction resource is created through an API request via API 110. Later, an API request hits the new transaction resource (by specifying a transaction identifier) to specify withdrawal information, then deposit information, and then the amount to be transferred. Once all the information is populated, the transaction may be executed either automatically, in response to an executed command, or scheduled for a later time. Bulk, aggregate, or group transactions may additionally be specified in a request. If multiple entities are withdrawal endpoints, then the division of funds may be specified (e.g., a percentage breakdown or amount breakdown). Similarly, funds for multiple deposit endpoints may be specified.

At block 520, which includes collecting transaction information of the endpoint, the system 100 functions to access and determine properties of a transaction endpoint. Collecting transaction information of the endpoint may involve using the account credentials to gain account access in an institution. The account access may be facilitated by using a proxy application, as described above. The account access can be used to request and obtain account documents that include endpoint information. The account documents may include pay or payroll statements or other suitable documents. If the documents are in PDF or other alternative formats, the content may be scraped to identify transaction information.

At block 530, the system 100 collects transaction information and/or transaction addressing information of the endpoint. The account addressing information may be the account number and the routing number of an account. Billing address, wire routing number, and/or other account information can additionally be pulled. In one variation, the account number and routing number are available in pay or payroll statements. An extraction script may be used to pull the document and then isolate the information from the document. Accessing the account number and the routing number in an automated fashion may avoid chances of error. As a first benefit, access to the account provides evidence that the owner of the account participated in providing the transaction endpoint information. As another benefit, the information is automatically pulled, which avoids human error.

Collecting transaction information of the endpoint, at block 530, may additionally include collecting transaction status information of the endpoint, which can include indication of fund requirements, account fraud checks, and other status information. Various stages can be built into providing the transaction information, which provide different safeguards and/or features into financial transactions.

In a first optional stage, the transaction status information can determine a sufficient funds status. The sufficient funds status may be applied to a withdrawal account to ensure that the account has funds to complete the transaction. Transaction history and/or current fund value may be accessed through the account access. In one variation, the fund amount is returned in the response such that the customer/developer/application can respond appropriately. In another variation, the transaction amount is compared to available funds. If sufficient funds are not found, then an error or warning may be raised.

In another optional stage, the account may be processed for fraud patterns. For example, the age of the account may be accessed. Newly created accounts may be less trustworthy than established accounts with significant history. Similarly, transaction history may be assessed for fraudulent behavior. If the account is used for a diverse range of transactions indicative of normal behavior, then the account may be identified as normal. If the account only participates in repeated high value transactions or other fraud patterns, then the account may be flagged as fraudulent. Additionally, the entities involved in the transaction may be indicative of fraud.

The method may additionally include verifying transaction conditions during one or more stages. Transaction conditions may be used to take any suitable action. The available actions can include permitting a transaction or preventing a transaction. Additionally, the action can include sending a notification. The notification can include an email, text message, a platform message, a phone call, or any suitable notification. The action may additionally include triggering a programmatic event. In one variation the programmatic event is a callback event, wherein an HTTP message is sent to a destination. Conditions may be customized or selected from a set of provided conditions. Example conditions can include a condition that triggers a notification for transactions over a particular amount; a condition based on available funds after the transaction to alert a user to funds below a threshold; and a condition based on the frequency of transactions or the entities involved in the transaction account. Conditions can be scoped for a developer account, a particular institution account, or for any suitable scope of entities.

At block 540, the system 100 returns a transaction response so as to transmit the results of the transaction request. The transaction response is may be made in a synchronous API message from the API 110 that is sent in response to an initial request. Alternatively, a status API resource may be used such that an application/service can periodically check the status API resource to determine the processing status and/or the results. Alternatively, any suitable approach may be used to provide the results to the initial request.

In an implementation, the response provides the addressing information used for an endpoint. If there are no errors or warnings with respect to the account, then account information may be NACHA compliant as the endpoint information was accessed and obtained in a manner that validates the ownership of the account (e.g., by providing credentials and optionally multi-factor authentication responses). The transaction response can include the account number, the routing number, and/or any additional information for the endpoint that is used in executing the transaction. The transaction response may additionally include the available funds, such that the requesting entity can check for sufficient funds. The response may additionally indicate if sufficient funds are available if the transaction amount was provided, which functions to hide the available funds from the requesting entity while preventing overdraft transaction. The transaction response can additionally include other fields such as a status field, where the account may be labeled according to any categorization of the account. For example, the status may indicate that the account is normal or fraudulent.

Additionally or alternatively, the method can include optional block 550. At block 550 the system 100 executes the transaction, which functions to process the transaction between two endpoints. In this variation a request to execute a transaction between at least two endpoints is received. Additionally, returning a transaction response may include returning results of the transaction in the response. In another implementation, the method includes executing the transaction. The transaction response can include information about the status of the transaction when the transaction is submitted, being processed, and/or completed. Transactions may not be instantaneous, and as such the initial transaction response may indicate if the transaction was successfully initiated. Successfully initiated means that the transaction endpoint information was successfully retrieved, that any conditional stages (such as a sufficient funds stage, a fraud-check stage, and custom conditions) are satisfied. A subsequent response or status resource may be updated that reflects the status of the transaction. A transaction resource may be updated with a pending process, when the transaction is initiated and proceeding normally. The transaction resource can be updated with a completed status possibly indicating the time of completion. If an error or issue is encountered, the status of the transaction resource may be updated to reflect the error or issue. The method may additionally include monitoring status of transaction and triggering programmatic event according to the status.

In one variation, executing the transaction can include establishing proxy accounts in at least two institutions, and expediting transactions between the two institutions through an internal deposit to a first proxy account in a first institution and a second internal deposit from a second proxy account in the second institution. In some cases, transactions between institutions are slower than transactions made within an institution. By establishing a cross institution account network, transactions can be facilitated between two accounts in different institutions with similar speeds of internal transactions. The proxy accounts may include a funds reserve, which may be periodically balanced between proxy accounts to maintain an operational reserve of funds.

Additionally, the method may be applied to create an abstraction between a user and the underlying account. A transaction endpoint can be abstracted to a user entity, which may be associated with multiple optional transactional endpoints (e.g., different payroll accounts). Accordingly, the method may include selecting an institution, which functions to dynamically select a connected account to participate in a transaction. Various conditions may be set to respond to events when receiving a transaction request, collecting information for the transaction, and/or executing a transaction. In one variation, one institution is set as a primary account and another account managed by the same entity is set as a secondary account. If the primary account is not able to complete a transaction, the method may detect an error condition and automatically fails over to the secondary account. In another variation, a set of accounts may be preconfigured to be used depending on properties of the request. In combination with the proxy transfer endpoint, the identifying information for the proxy endpoint can be used, but the underlying service automatically will use an automatically selected account to use for the funds. For example, a set of entities and/or category of entities/transactions may be set to use particular accounts. Similarly, transactions to one proxy account may be automatically split into transactions with multiple associated accounts. For example, an account holder may set a proxy account to automatically split deposits between two accounts in a 30/70 balance.

Referring now to FIG. 6, the system 100 functions to provide an interface (e.g., via the API 110) for applications and services that can facilitate the process of transferring funds. The system 100 can function to provide verified account information used in ACH transfers, to execute transfer of funds, to enable programmatic events during transfer process, to mitigate risk and errors, and/or provide alternative transaction functionality. As described above in reference to FIG. 1, the system 100 is part of a larger API platform, which provides an API to access account data and execute transactions, among other items. In some variations, the system 100 is part of a multi-tenant API platform that enables a plurality of developers to create accounts and build applications and/or services that leverage the API of the API platform. In alternative variations, the system 100 is part of a single-tenant API platform and may provide an internal API for a dedicated set of products or services. For example, a product may be built on top of the API platform that enables end users to create accounts to manage accounts with one or more institutions (e.g., payroll providers/institutions, credit card companies, investment managers, etc.).

The API 110 functions to provide an interface for accessing institution transaction endpoint information. The API 110 can additionally provide a normalized customer facing interface. In one implementation, the API 110 leverages an application proxy instance 121, which simulates a proprietary first-party application accessing a closed API of an institution (e.g., the institution 142). The system 100 can include additional components or services that particularly facilitate the access of information relating to a transaction endpoint. For example, a service, script, or module can be configured to access statements or other suitable documents that can contain endpoint information such as account number and routing number information. The statements or information may be contained in pdf or other suitable document formats. The system 100 can include document readers that can access and extract the requested information from the statements.

In one variation, the API 110 allows an API request to specify an account, and a response output provides the information related to executing a transaction with the endpoint. In one implementation, the API 110 can include at least one API resource for interacting with the transaction endpoint. As shown in FIG. 7, an endpoint information request can include institution credentials of an account. The credentials can include username and password. The API protocol can additionally provide a mechanism for completing multi-factor authentication challenges such as security questions, or code-based multi-factor authentication. The API request may additionally include other properties such as developer account identifiers, API authentication tokens, institution type identifiers, and other suitable parameters. The response is a data object that includes at least automatically obtained information such as tracking number, routing number, and/or wire routing number. Additional response information can include funds amount (or alternatively a Boolean indicator if the funds are sufficient), an account status (e.g., is the account fraudulent, trusted, etc.), billing address of the account, name of the institution, type of account (e.g., saving, depository, etc.), and other suitable properties. Other API properties or features can include a mechanism to specify if endpoint information is requested or if the transaction should be executed.

The institution interface module 132 functions to model the internal interface of at least one first-party application with an external institution (e.g., institution 142). The account credentials of a user account (and optionally multi-factor authentication credentials) can be used for an application proxy to gain access to an institution through the institution interface module. The system 100 may additionally include a transaction engine 193, which can facilitate the transfer of funds between two accounts. The transaction engine 193 can be integrated with the API 110, such that an API request can direct the execution of a transaction. The transaction engine 193 can execute ACH transactions, but may alternatively or additionally use other financial tools to withdrawal funds and/or deposit funds. With a transaction engine, transactions can be executed between two accounts that have been configured with account credentials. The API response may include the status of the transaction, transaction errors, a status URI or any suitable response to facilitate executing a transaction as shown in FIG. 8. In one variation, proxy accounts can be used in different institutions. With sufficient reserves, transfers between institutions can be expedited by transferring funds to and from the proxy accounts, and then asynchronously updating the proxy accounts.

The system 100 can additionally include other aspects such as a messaging/notification system, which can manage alerts and/or triggering programmatic events (e.g., callbacks), an engine for generating user interfaces and/or user interface data, and/or the like. The system 100 may additionally or alternatively include any other suitable components to implement the functionality of described in the present disclosure.

In some implementations, the system 100 includes a document processing engine 194. In some implementations, the document processing engine 194 is constructed to process account documents (e.g., account documents 192) of an external user account system (e.g., payroll system 142) of an external institution. The account documents may be processed to identify and/or obtain transaction information. In some implementations, in a case where the documents are in a PDF format, the document processing engine 194 is constructed to scrape content of the PDF documents to identify the transaction information. In some implementations, the document processing engine 194 is an extraction script that is constructed to pull the document and then isolate the transaction information from the document (e.g., as described above in reference to FIG. 5). In some implementations, the system 100 accesses the document, stores the accessed document (e.g., in a memory or other storage medium of the system 100), and then controls the document processing engine to process the stored document to identify the transaction information.

Figure 9:
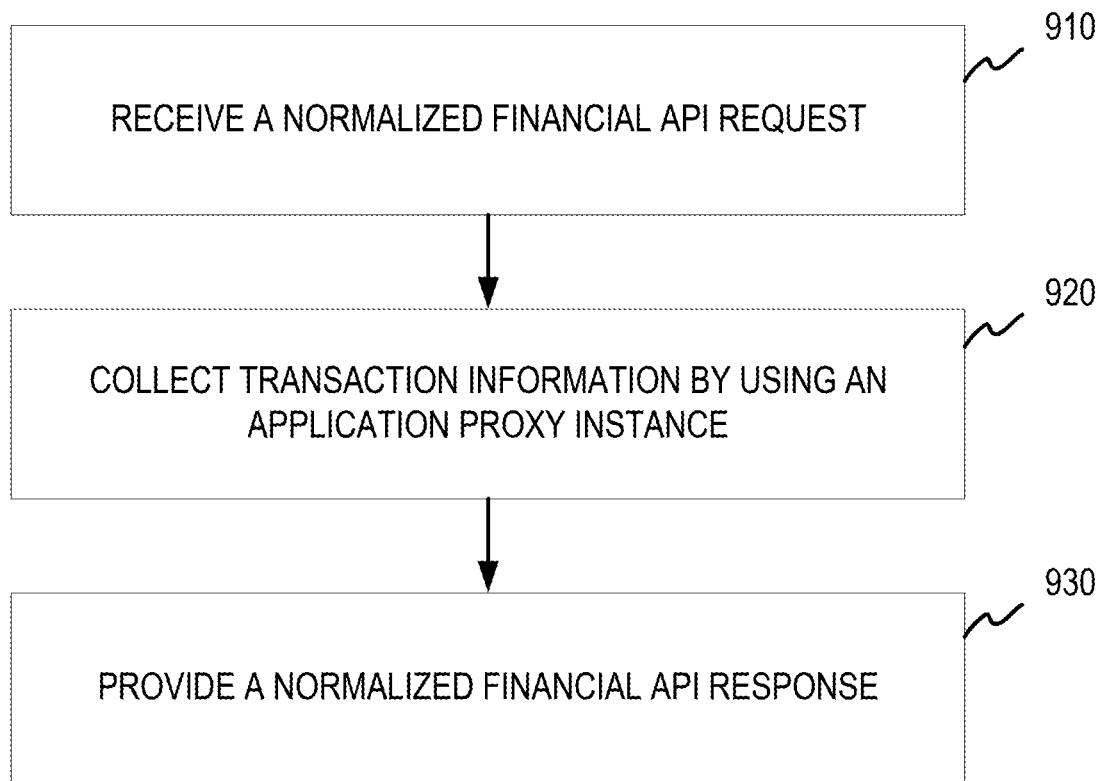
FIGS. 9-10 are flowcharts illustrating example methods of processing transactions, according to various embodiments.
Figure 10:
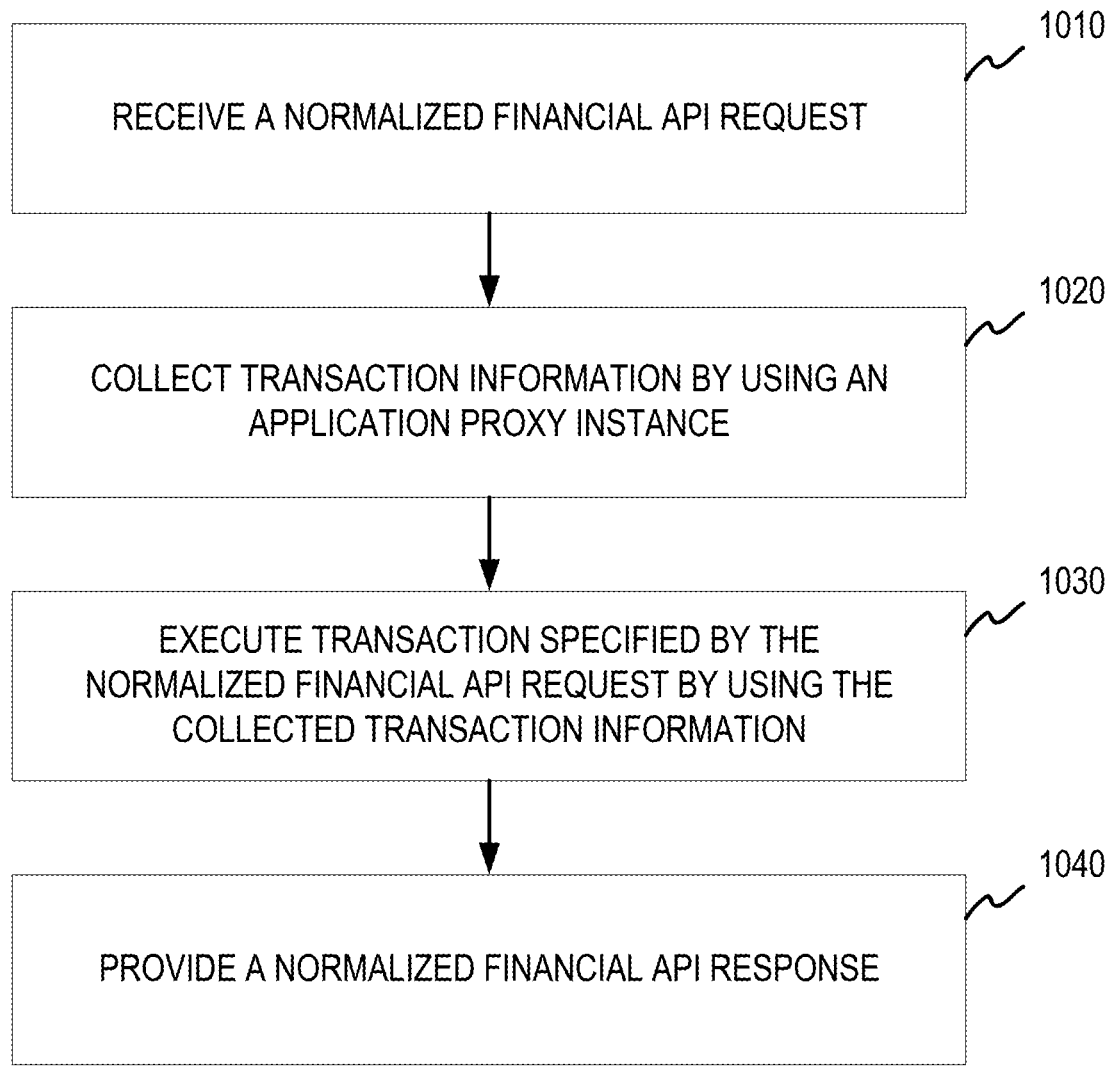

FIGS. 9-10 are flowcharts illustrating example methods of processing transactions, according to various embodiments. The methods of FIGS. 9-10 are described below in reference to certain aspects of FIG. 1 (or, alternatively, FIG. 6).

Referring to FIG. 9, a method for processing a normalized API request at the system 100 includes: receiving a normalized API request associated with at least one account endpoint, the normalized API request being provided by an external user-facing system/application (e.g., system/application 152 of FIG. 1) by using API 110 of the system 100, the normalized API request specifying account credentials of each account endpoint of the normalized API request (block 910).

Responsive to the normalized API request: transaction information of each account endpoint of the normalized API request is collected by using an application proxy instance (e.g., one of proxy instances 121, 122, and/or 123 of FIG. 1) associated with the account endpoint to collect the transaction information from a corresponding institution system (e.g., an external user account system 141, 142, and/or 143 of FIG. 1) by using the associated account credentials specified by the normalized API request and a proprietary API) (e.g., one of APIs 161, 162, and/or 163 of FIG. 1) of the system 100 (block 920).

Further, a normalized API response is provided to the external user-facing system/application (block 930). The normalized API response provides the transaction information of each account endpoint of the normalized API request. Each application proxy instance is constructed to simulate an application of the corresponding external institution system.

In some implementations, the collected transaction information for each account endpoint includes at least an account number and a corresponding routing number for use in automated clearing house (ACH) transactions. In some implementations, the transaction information is collected by processing at least one statement accessed from the corresponding external institution system.

Additional examples and details of obtaining transaction and account information via proxy instances of the system may be found in U.S. patent application Ser. No. 14/790,897, filed Jul. 2, 2015, and titled "SYSTEM AND METHOD FOR FACILITATING PROGRAMMATIC VERIFICATION OF TRANSACTIONS" (referred to herein as "the '897 application"). The entire disclosure of this application is hereby made part of this specification as if set forth fully herein and incorporated by reference for all purposes, for all that it contains.

Referring to FIG. 10, a method for processing a normalized API request at the system 100 includes: receiving a normalized API request associated with at least one account endpoint (block 1010). The normalized API request is provided by an external application system by using a platform API of the platform system. The normalized API request specifies a transaction and at least one of an account token and account credentials of each account endpoint of the normalized API request.

Responsive to the normalized API request, transaction information of each account endpoint of the normalized API request is collected (block 1020). The transaction information is collected by using an application proxy instance associated with the account endpoint to collect the transaction information from a corresponding institution system by using at least one of an associated account token and associated account credentials specified by the normalized API request and by using a proprietary API of the institution system.

The transaction specified by the normalized API request is executed by using the collected transaction information (block 1030). A normalized API response is provided to the external system (block 1040). The normalized API response provides results of the transaction. Each application proxy instance is constructed to simulate an application of the corresponding external institution system.

In some implementations, the collected transaction information for each account endpoint includes at least an account number and a corresponding routing number for use in automated clearing house (ACH) transactions.

In some implementations, the transaction information is collected by processing at least one statement accessed from the corresponding external institution system.

In some implementations, the transaction information (and/or any other account-related information) is collected via one or more of: an application proxy instance, screen scraping (e.g., of a webpage of the institution), an API request to an API of the institution (e.g., that the system is authorized to access), or any combination of these methods.

Additional examples and details of such functionality of the system may be found in the '897 application.

In some implementations, the user information of the normalized API request includes a user account identifier for each user account of the external user-facing system/application (e.g., the external user-facing system/application 152) corresponding to the normalized API request.

In some implementations, the normalized API request includes parameters as shown in Table 1.

TABLE 1

| NORMALIZED API REQUEST PARAMETER | DESCRIPTION |
| --- | --- |
| <Platform Account ID> | An account of an external user-facing system/application (e.g., "Dev Account A", "Dev Account B" of FIGS. 1 and 4A-4B). |
| <User Account Identifier> | An identifier that identifies a user account of the application system identified by the <Platform Account ID> parameter. |
| <Institution ID> | An identifier that identifies an external institution system (e.g., institutions 141, 142, and/or 143). |

In some implementations, the <User Account Identifier> is used to select at least one corresponding application proxy instance, and each selected application proxy instance includes user credentials (e.g., as depicted in FIG. 4B) to access the associated institution system.

In some implementations, the system 100 determines an application proxy instance associated with the normalized API request based on the <Platform Account ID> parameter, the <User Account Identifier> parameter, and the <Institution ID> parameter. In some implementations, the system 100 identifies an application proxy instance of the application proxy system 120 that is managed in association with the <Platform Account ID> parameter, the <User Account Identifier> parameter, and the <Institution ID> parameter, and uses the identified application proxy instance to collect the transaction information.

In some implementations, each proprietary API request includes parameters as shown in Table 2.

TABLE 2

| PROPRIETARY API REQUEST PARAMETER | DESCRIPTION |
| --- | --- |
| <User Credentials> | The user credentials of the corresponding normalized API request. The user credentials are specified by the application proxy instance, e.g., 421-425, (e.g., as shown in FIG. 4B) used to provide the proprietary API request. |

In various other implementations, the normalized API requests and/or the proprietary API requests may include other sets of parameters, depending on the specifics of the APIs and the types of requests involved. For example, other requests may include identifier tokens, multiple account identifiers (e.g., when requesting transfer of funds), etc. Additional examples and details of such other types of requests and functionality of the system may be found in the '897 application.

In some implementations, the system may send various types of alerts and/or other indications to a user device (e.g., user devices 171, 172, and/or 173). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user device. For example, as described herein, alerts may be communicated with the user device for the purpose of completing a multi-factor authentication process. In such an example, an SMS message with a secret/authentication code may be communicated to the user device, activating an SMS process and/or application (and/or another process and/or application) on the user device. Such an alert may be sent by the system and/or an institution system. In another example, the system may send alerts to the user device regarding access to a user account of the user, a transaction, and/or the like. Such alerts may notify the user that a new transaction has posted to their account, that a transaction has posted for a particular amount, a transaction has been denied, and/or the like. Such alerts may comprise SMS messages, email messages, and/or other types of messages that may activate various processes and/or applications, as described above. In yet another example, the system may send an alert to the user device including an account document, which may cause a process and/or application suitable for reading the account document to be activated on the user device.

V. System Architecture

Figure 11:
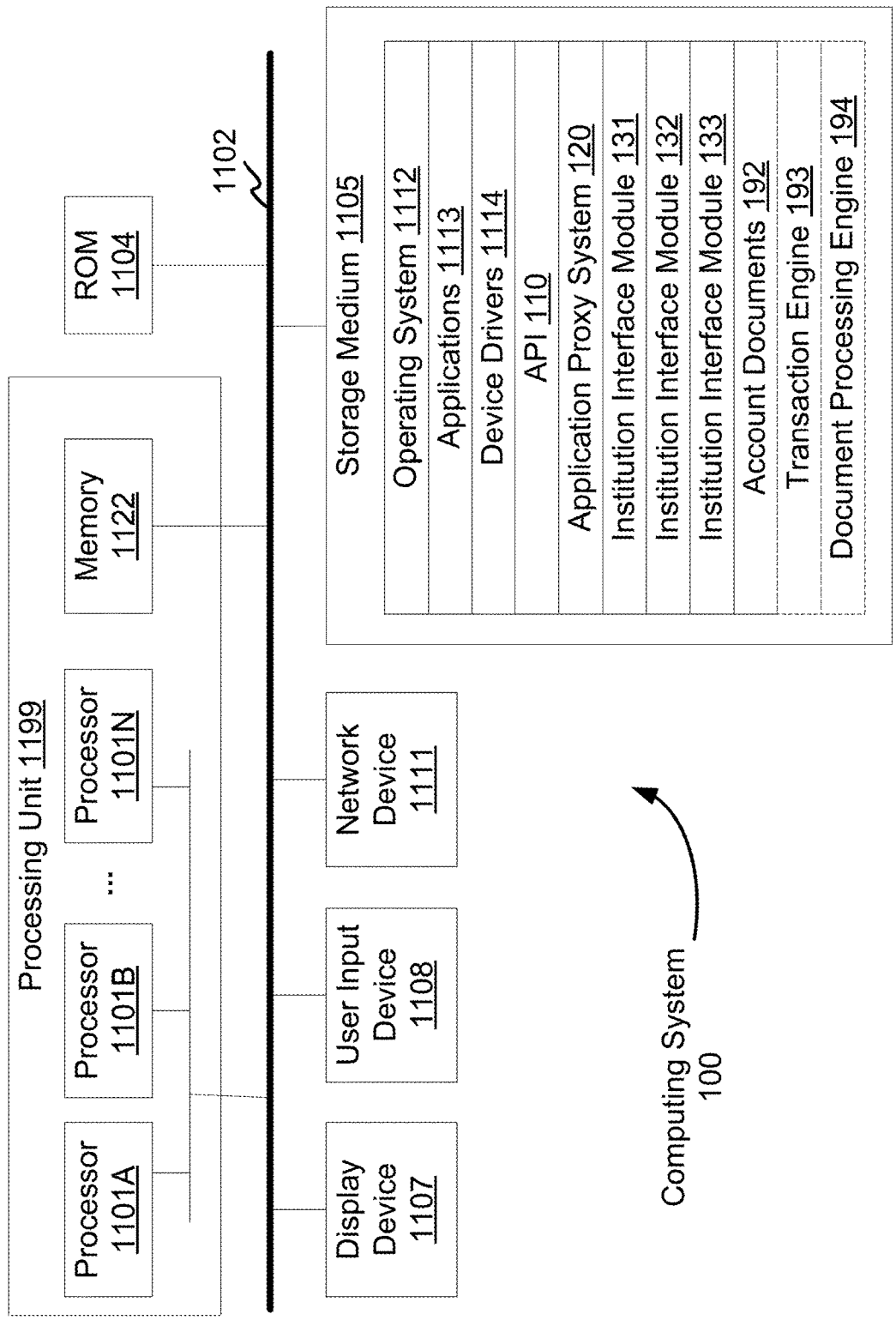
FIG. 11 is a block diagram of an example architecture of the system, according to an embodiment.

FIG. 11 is an architecture diagram of the system 100 according to an implementation in which the system is implemented by a server device. Alternatively, the system may be implemented by a plurality of devices, in a hosted computing environment (e.g., in a cloud server), and/or in any other suitable environment.

The bus 1102 interfaces with the processors 1101A-1101N, the main memory (e.g., a random access memory (RAM)) 1122, a read only memory (ROM) 1104, a computer readable storage medium 1105 (e.g., a non-transitory computer readable storage medium), a display device 1107, a user input device 1108, and a network device 1111.

The processors 1101A-1101N may take many forms, such as ARM processors, X86 processors, and/or the like.

In some implementations, the system includes at least one of a central processing unit (processor) and a multi-processor unit (MPU).

The processors 1101A-1101N and the main memory 1122 form a processing unit 1199. In some embodiments, the processing unit includes one or more processors communicatively coupled to one or more of a RAM, ROM, and computer readable storage medium; the one or more processors of the processing unit receive instructions stored by the one or more of a RAM, ROM, and computer readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an API, an application proxy system, one or more instance interface modules, account documents, a transaction engine, a document processing engine, and/or any other functionality or aspects of the system as described herein.

The network adapter device 1111 provides one or more wired or wireless interfaces for exchanging data and commands between the system and other devices, such as external user account systems (e.g., institutions 141, 142, and/or 143), external user-facing systems/applications (e.g., applications 151 and/or 152), user devices (e.g., user devices 171 and/or 172), and/or the like. Such wired and wireless interfaces include, for example, a universal serial bus (USB) interface, Bluetooth interface, Wi-Fi interface, Ethernet interface, near field communication (NFC) interface, and/or the like. In some embodiments, the system communicates with other devices via the Internet.

Machine-executable instructions (e.g., computer readable program instructions) in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1102, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 includes an operating system 1112, software programs/applications 1113, device drivers 1114, the API 110, the application proxy system 120, the institution interface modules 131, 132, and 133, and account documents 192. In some implementations, the processor-readable storage medium 1105 includes the transaction engine 193 and the document processing engine 194. Further details regarding the system architecture are described below.

Figure 12:
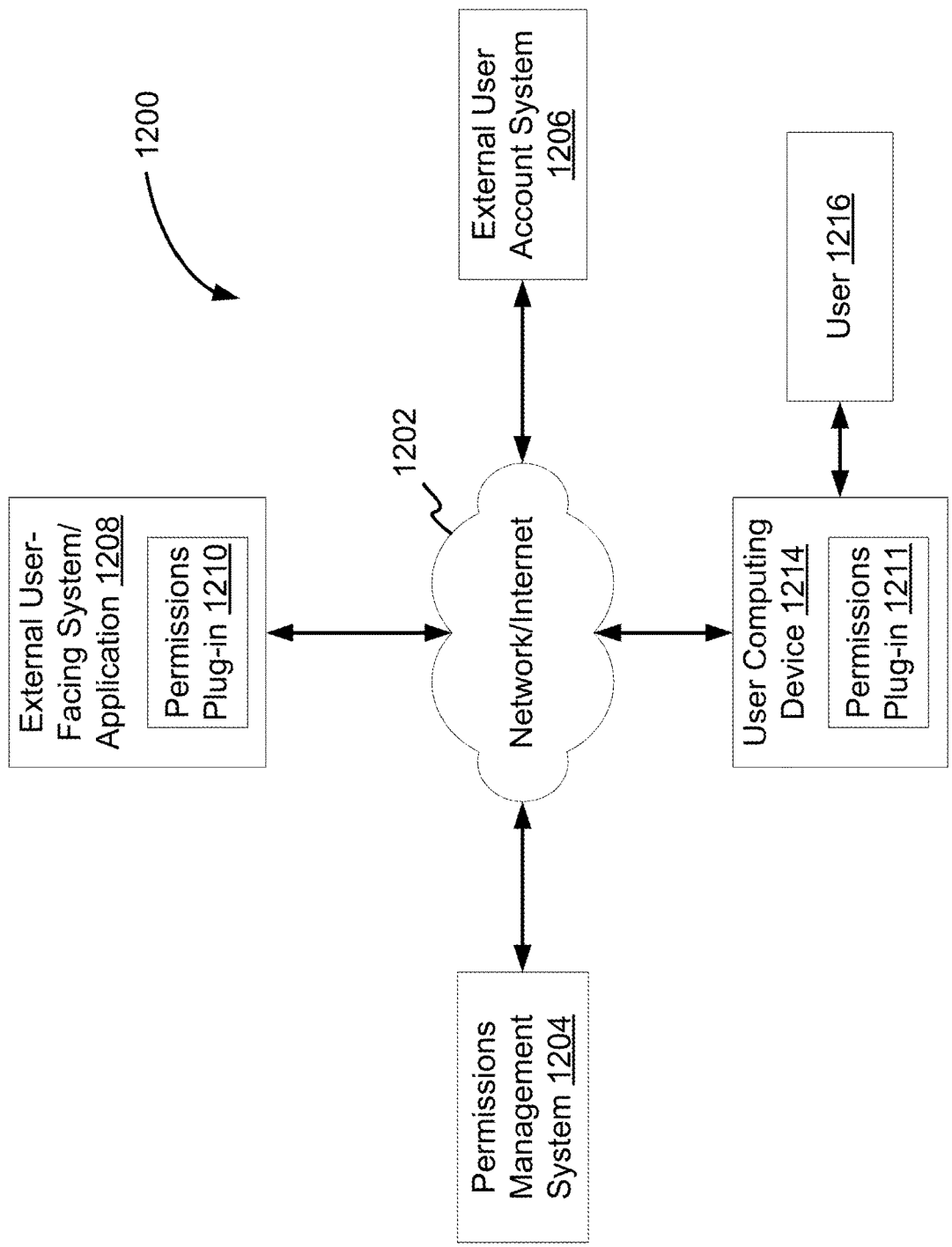
FIG. 12 illustrates an example network environment in which a permissions management system may operate, according to various embodiments.

VI. Example Network Environment of the System when Implementing Permissions Management FIG. 12 illustrates an example network environment 1200 in which a permissions management system 1204 may operate, according to an embodiment. As shown, the network environment includes the permissions management system 1204, an external user account system 1206, an external user-facing system/application 1208, a permissions plug-in 1210, a permissions plug-in 1211, a user computing device 1214, and a user 1216. The various aspects of the network environment 1200 may communicate via a network/Internet 1202. The network/Internet 1202 may comprise a wired and/or wireless network, and/or in certain embodiments may comprise one or more wired and/or wireless network. The various components of the network environment 1200 may communicate via the network/Internet 1202, and/or alternatively may communicate directly with one another via one or more other wired or wireless connections. In some embodiments, the permissions management system 1204 may include the functionality of the system 100 described above, and/or the functionality of the system 100 described above may be implemented in one or more other computing systems in the network environment 1200. For clarity of description, however, the following description assumes that the permissions management system 1204 includes the functionality of the system 100 described above.

Additionally, the external user account system 1206 may comprise a system of an institution (e.g., one of institution systems 141, 142, and/or 143), and while more than one the external user account system 1206 may be involved in communication with the permissions management system 1204, one external user account system 1206 is shown in FIG. 12 for purposes of clarity.

Further, external user-facing system/application 1208 may comprise the system and/or application, entity, merchant, and/or the like, with which the user may interact. For example, the user 1216 may interact with the external user-facing system/application 1208 via the user computing device 1214. In one example, the external user-facing system/application 1208 may comprise an app, and/or web-based application, running on and/or rendered by the user computing device 1214 (e.g., a mobile device, and/or the like), as described above (e.g., in reference to app 151 and/or 152).

In an embodiment, the external user-facing system/application 1208 may include the permissions plug-in 1210. The permissions plug-in 1210 may comprise a software/code module, snippet, and/or the like, which may be integrated into the external user-facing system/application 1208. The permissions plug-in 1210 may be provided by the permissions management system 1204 and/or the external user account system 1206 such that the external user-facing system/application 1208 may include functionality provided by the permissions management system 1204 (either directly or indirectly via the external user account system 1206). In one implementation, the permissions plug-in 1210 comprises JavaScript code (or code written in any other programming language) integrated into the external user-facing system/application 1208. The JavaScript code, when executed, may communicate with the permissions management system 1204 and/or the external user account system 1206 to provide certain functionality as described herein. Advantageously, in some implementations, the permissions plug-in 1210 may generate interactive user interfaces that may be presented to the user 1216. Information may be obtained from the user 1216 via the interactive user interfaces of the permissions plug-in 1210 (e.g., account credentials, and/or the like). The permissions plug-in 1210 may obtain such information, and communicate the information to the permissions management system 1204 and/or the external user account system 1206 in a secure manner such that the external user-facing system/application 1208 does not have access to the information provided by the user 1216.

Further, the permissions plug-in 1210 may advantageously handle establishing secure communications with the permissions management system 1204 and/or the external user account system 1206, and/or other functionality as described herein, such that a developer of the external user-facing system/application 1208 need not be concerned with these aspects (thus speeding development of the external user-facing system/application 1208).

In an embodiment, the user computer device 1214 may include the permissions plug-in 1211 that functions similarly to the permission plug-in 1210 described above. Similar to the permissions plug-in 1210, the permissions plug-in 1211 may comprise a software/code module, snippet, and/or the like. The permissions plug-in 1211 may be integrated into another software application executed by the user computing device 1214 (e.g., a software application dedicated to enabling communications with, e.g., the external user account system 1206) or may otherwise be executable by the user computing device 1214 (e.g., by a web browser of the user computing device 1214). The permissions plug-in 1211 may be provided by the permissions management system 1204 and/or the external user account system 1206 such that the user computing device 1214 may include functionality provided by the permissions management system 1204 (either directly or indirectly via the external user account system 1206). In one implementation, the permissions plug-in 1211 comprises JavaScript code or code written in any other programming language. The JavaScript code, when executed, may communicate with the permissions management system 1204 and/or the external user account system 1206 to provide certain functionality as described herein. Advantageously, in some implementations, the permissions plug-in 1211 may generate interactive user interfaces that may be presented to the user 1216. Information may be obtained from the user 1216 via the interactive user interfaces of the permissions plug-in 1211 (e.g., account credentials, and/or the like). The permissions plug-in 1211 may obtain such information, and communicate the information to the permissions management system 1204 and/or the external user account system 1206 in a secure manner such that the external user-facing system/application 1208 does not have access to the information provided by the user 1216. Further, the permissions plug-in 1211 may advantageously handle establishing secure communications with the permissions management system 1204 and/or the external user account system 1206, and/or other functionality as described herein, such that a developer of the external user-facing system/application 1208 need not be concerned with these aspects (thus speeding development of the external user-facing system/application 1208).

In addition to the detailed description of the functionality provided below, additional examples and details may be found in U.S. Provisional Patent Application No. 62/215,603, filed Sep. 8, 2015, and titled "Link," and U.S. Patent Application Publication No. 2017/0070500, published Mar. 9, 2017, and titled "SECURE PERMISSIONING OF ACCESS TO USER ACCOUNTS, INCLUDING SECURE DEAUTHORIZATION OF ACCESS TO USER ACCOUNTS," the entire disclosures of each of which are hereby made part of this specification as if set forth fully herein and incorporated by reference for all purposes, for all that they contain.

VII. Example Systems and Methods for Parsing Raw Transaction Data

As described above, aspects of this disclosure relate to the system 100, which enables access to user account data from one or more external account systems. The system 100 can thus connect user's accounts, at external user account systems, to applications to enable developers to build various products and services. An advantage to this approach is that it removes the need for developers to build individual connections to various external user account systems, and normalizes the data that is used across multiple user accounts. One challenge that can arise when accessing data from multiple sources is data normalization. That is, because there may be potentially thousands of different ways in which transaction data is expressed, it can be difficult to provide a normalized format (e.g., standardized format) for data that is expressed in these different ways.

There is no standardized format used across entities such as external user account systems (e.g., banks, financial institutions, and the like) for generating records of transactions. As a result, transaction data may be complex, and it can be difficult for a user to interpret raw transaction data. For example, user account statements may include text strings that may be difficult to parse. The data that user account systems natively provide can be messy, inconsistent, and convoluted. Thus, there is a need for systems and methods which can take raw transaction data and automatically normalize the data to provide a standardized set of fields (e.g., date, location, entity or merchant name, etc.) which can be more easily deciphered and consumed in a more structured manner.

The following examples illustrate a small selection of how data for the same transaction type may differ: "chick-fil-A 3848489", "POS DEBIT Chick Fil A 4/5", and "Authorized purchase Chkfila 333222121 NY NY".

It can be advantageous to normalize these types of transaction data to increase the value of transaction data from being just a record of financial activity to being the building blocks of deep user understanding. Without consistency, it may be difficult for customers/users to find meaningful insights from the data to, for example, help make better financial decisions.

Two particular pieces of data that can be parsed from transaction data include location data and entity data. The following example transaction data will be used to aid in demonstrating challenges which can arise when parsing transaction data: "McDonald's F1001 01/21/2020 New York NY".

One approach to this type of challenge within the field of machine learning is Named Entity Recognition ("NER"). NER can involve locating named entities within unstructured text and classifying the identified named entities into predefined categories. Two of the named entities that may be relevant within the context of transaction data include Location and Entities.

Depending on the application, NER problems may be solved with machine learning approaches. However, in parsing transaction data, it may be necessary to use machine learning approaches (e.g., which can require complex models) to parse all transaction records. For example, when parsing a transaction description such as the example provided above, it is possible to determine that the transaction relates to the entity McDonald's and the location New York, NY. Thus, for transaction data in which the location and/or entity data can be identified without machine learning approaches, the computationally intensive machine learning model can be skipped and the transaction data parsing method can directly return, for example, the location and/or entity result. In some implementations, aspects of this disclosure relate to an algorithm which applies fuzzy string matching (which may comprise "light" fuzzy string matching, meaning that the required matching threshold may be relatively low) to extract location information from the transaction description with a location corpus, and a Merchant Normalizer Algorithm which identifies the likely entity and/or merchant based on, for example, a modified Jaccard similarity score.

Unfortunately, not all transaction descriptions include location strings which appear in a tidy format. In addition, due to the ever changing and vast number of entities operating at any given time, there are almost always new entities that have not been previously identified. One example of such a transaction description is: "POS WD SAPPS #06 / 06063-BEDMINSTER NJ US".

Figure 13:
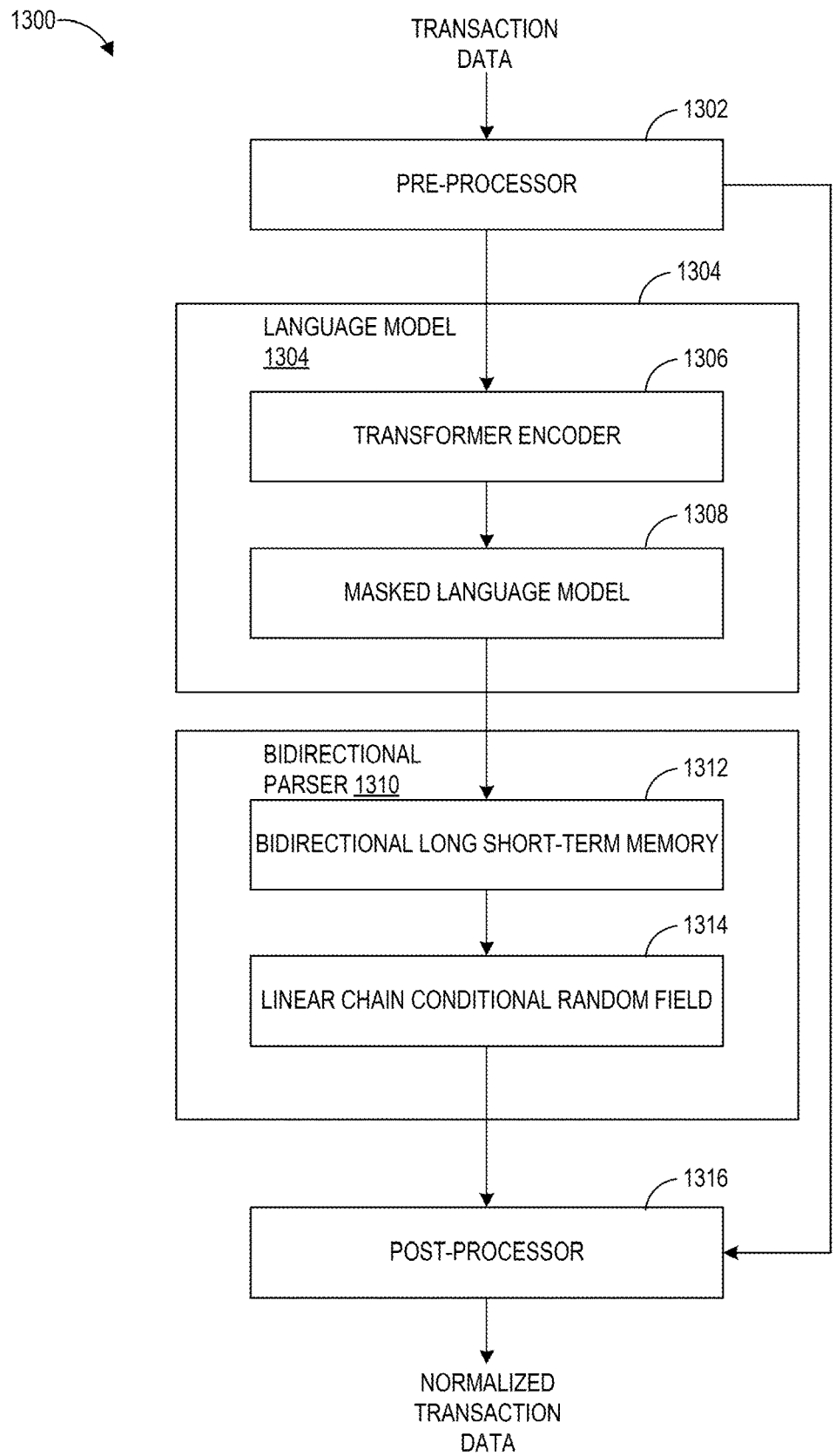
FIG. 13 illustrates an example method for parsing transaction descriptions in accordance with aspects of this disclosure.

This example transaction description may reflect a transaction executed for a new restaurant called SAPPS which recently opened in Bedminster, NJ. A Naive Location Matcher may not be able to determine that Bedminster, NJ represents a location since the token 'BEDMINSTER' is concatenated with a numeric string, and the string 'US' is also appended after 'NJ.' For the entity, since SAPPS may be a new brand entity and thus not included in an entity dataset (also referred to as a corpus), the system may not be able to identify the entity from the description by matching to the entity dataset. FIG. 13 illustrates an example system 1300 for parsing transaction descriptions including transaction descriptions which include location and/or entity information which is not present in a corresponding corpus in accordance with aspects of this disclosure. In certain embodiments, the system 1300 of FIG. 13 may be included as a part of the computing system 100 illustrated in FIG. 1. For example, the system 1300 may be implemented as part of the transaction processing engine 193 to generate normalized transaction data, or may be included as a separate system within the computing system 100. In some implementations, the normalized transaction data may be generated as a part of collecting and processing transaction information and/or providing a normalized API response at blocks 920, 930 of FIG. 9 or blocks 1020, 1040 of FIG. 10.

With reference to FIG. 13, the system 1300 includes a pre-processor 1302 configured to receive transaction data, a language model 1304, a bidirectional parser 1310, and a post-processor 1316 configured to output normalized transaction data. The pre-processor 1302 may be configured to perform the fuzzy string matching described above. In the event that the fuzzy string matching returns both location and entity information, the system may proceed directly to the post-processor 1316, skipping the processing typically performed by the language model 1304 and the bidirectional parser 1310. If the fuzzy string matching returns only one of the location information or the entity information, or neither of the location information or the entity information, the system may proceed to the language model 1304 and the bidirectional parser 1310.

The language model 1304 includes a transformer encoder 1306 and a masked language model ("MLM") 1308. The transformer encoder 1306 is configured to encode the internal meaning of a word with the information contained in its neighboring words through an attention mechanism. The masked language model 1308 is configured to use the context words surrounding a [MASK] token to try to predict the meaning of the [MASK] token. Although the transformer encoder 1306 is illustrated as separate from the MLM 1308, in certain embodiments, the transformer encoder 1306 may be implemented as a part of the MLM 1308.

The bidirectional parser 1310 includes a bidirectional long short-term memory ("LSTM") 1312 and a linear-chain conditional random field ("CRF") 1314. The bidirectional LSTM 1312 is configured to model the long-term dependencies in the sequential data received from the language model 1304 and generate predictions by preserving information from both past and future tokens within the currently processed transaction description. The linear-chain CRF 1314 is configured to predict sequences of labels taking consideration of the surrounding labels. Using the sequences of labels provided by the bidirectional parser 1310, the post-processor 1316 is configured to generate normalized transaction data, which may include fields that represent the location data and/or entity data in a standardized format.

Additional details regarding the operation of the language model 1304 and the bidirectional parser 1310 for extracting location data and/or entity are provided below.

VIII. Language Model

In general, a statistical language model, such as the language model 1034 of FIG. 13, is a probability distribution over sequences of words. Given a sequence of words, the model assigns a probability to each word or token in the sequence. More practically, a language model encodes the internal meaning of a word with the information contained in one or more of its neighboring words. Typically, the model will encode a given the internal meaning of a token with the information contained in all of the other tokens within a sequence. There are two major categories of language model approaches:

1. MLM approaches which are configured to predict a [MASK] token using all tokens in a sentence.

2. Autoregressive ("AR") approaches which are configured to perform left-to-right prediction or right-to-left prediction.

Typically the MLM approach works better for Natural Language Understanding tasks (e.g. Named Entity Recognition, Text Classification, etc.), and the Autoregressive approach performs well for Language generation tasks due to its sequential nature. By using the [MASK] token in MLM, the language model 1304 and masked language model 1308 of the system 1300 is able to model the meaning of a word using all surrounding words within a sentence or sequence except for the word itself. By refraining from using a given word to model the meaning of itself, the model can avoid learning each word from its own embeddings and ignoring the contextual information.

In certain implementations, the system 1300 uses an MLM 1308 similar to Bidirectional Encoder Representations from Transformers ("BERT") to aid in addressing the Location and Merchant Parsing problem(s) described above. BERT is designed to pre-train deep bidirectional representations of natural language by using Transformer Encoders to encode contextual information of the input sequences.

IX. Transformer Encoder

The transformer encoder (such as the transformer encoder 1306) can be considered a Sequence-to-Sequence (Seq2Seq)

encoder combined with an attention mechanism. A Seq2Seq encoder generally takes in a sequence of items (e.g., words or tokens) and outputs another sequence of a vector in which each item is encoded with the information from the surrounding items. The attention mechanism is configured to decide which other item(s) in the sequence are important, while encoding and understanding the information of a specific item. For instance, in the example sentence: "Jack won the championship and he felt so proud of it," through learning from the text sequence, the attention mechanism can encode an understanding that 'he' refers to the person 'Jack' and then assign more significant attention to the token 'Jack.'

X. Masked Language Model

Figure 14:
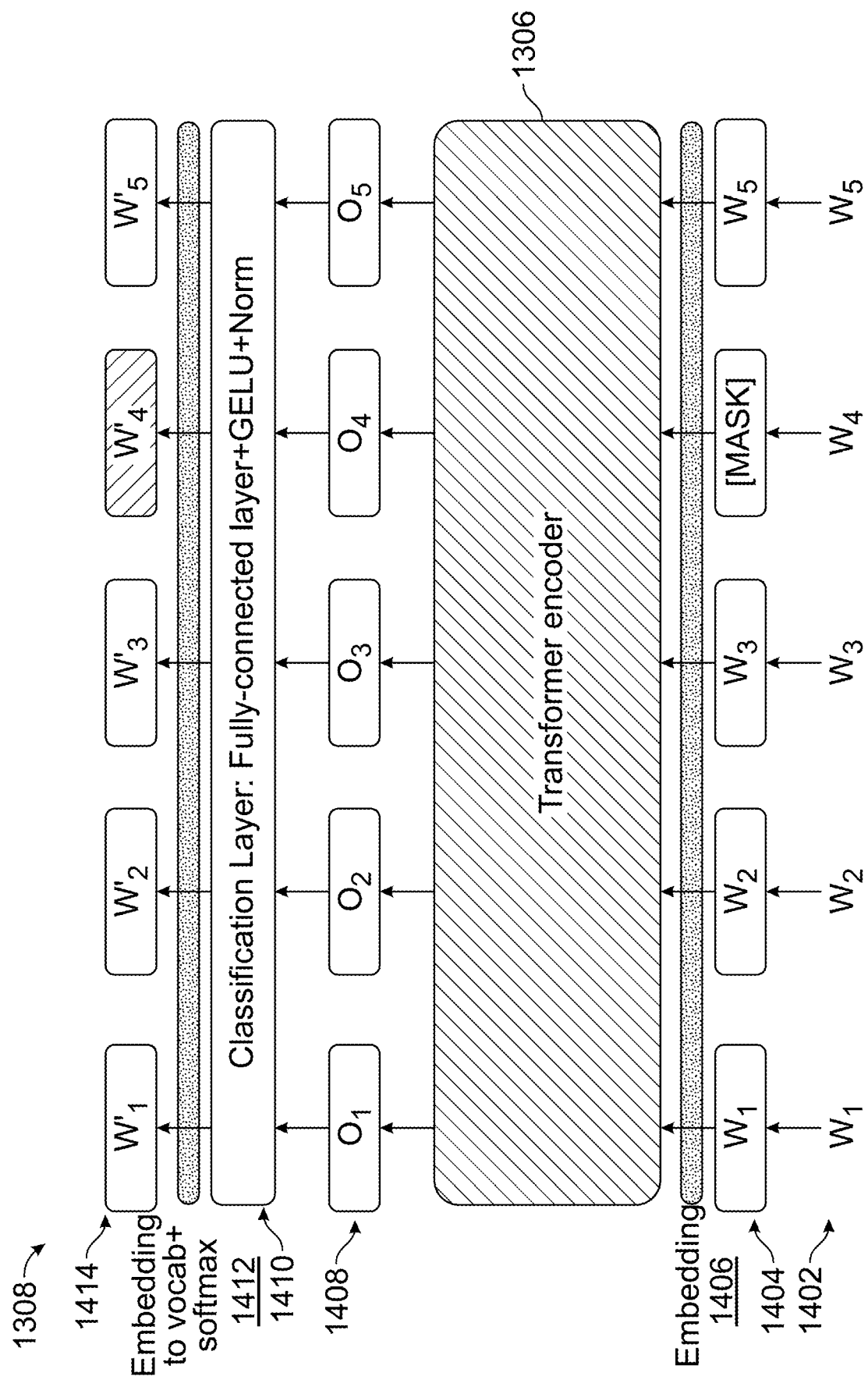
FIG. 14 is an example diagram illustrating the model structure of the masked language model in accordance with aspects of this disclosure.

FIG. 14 is an example diagram illustrating the model structure of the masked language model 1308 in accordance with aspects of this disclosure. As shown in FIG. 14, the masked language model 1308 receives a transaction description 1402 including a sequence of words W1-W5, a sequence of tokens 1404 in which one of the tokens is masked, an embedding layer 1406, the transformer encoder 1306, a first sequence of vectors 1408, a classification layer 1410, and an embedding layer 1412. The masked language model 1308 outputs a second sequence of vectors 1414 in which each vector is encoded with the information of its surrounding elements. Each of the first and second sequences of vectors 1408 and 1414 may be a sequence of multi-dimensional numerical vectors. Although five words are illustrated in the received sequence, the masked language model 1308 can operate on any transaction data including two or more words.

In describing the various parts of the masked language model 1308, the following transaction description will be used as an example to illustrate the model's behavior at a high level: "McDonald's New York NY." The masked language model 1308 first tokenizes the transaction description to generate the sequence of tokens 1404. Tokenizing the example transaction data may provide the following sequence of tokens: ["McDonald' s," "New," "York," "NY"].

Next, the masked language model 1308 may send the sequence of tokens 1404 through the embedding layer 1406 which transforms tokens into a 2D matrix. FIG. 15A illustrates an example 2D matrix 1502 which may be generated based on example sequence of tokens.

The masked language model 1308 can also encode the embeddings input with contextual information through a set of transformer encoder 1306 layers. FIG. 15B illustrates an example 2D matrix 1504 which may be generated using the transformer encoder 1306.

The masked language model 1308 can further apply a classification layer 1410 including a fully connected layer, GELU, and layer normalization (Norm) to apply linear transformation to the encoding results received from the transformer encoder 1306. As used herein, GELU generally refers to an activation function which serves as a switch that triggers neuron output and layer normalization generally refers to a technique used to standardize the inputs to a network and help to speed up learning, which generally leads to faster convergence. FIG. 15C illustrates an example 2D matrix 1506 which may be generated using the fully connected layer 1410.

The masked language model 1308 can apply an embedding to vocabulary and a softmax layer 1412 to produce probability for each possible token as illustrated by the example 2D matrix 1508 shown in FIG. 15D.

The masked language model 1308 may further update the model parameters with back propagation after calculating the loss.

The trained masked language model 1308 may function effectively as a Seq2Seq encoder which takes in a textual sequence 1402 and emits another sequence 1414 in which each element is encoded with the information of its surrounding elements.

Depending on the implementation, the MLM 1308 may be an unsupervised learning approach, such that the MLM 1308 is not limited by the amount of labeled data when building the model 1308. By feeding the large number of transactions managed by the system 100 into the model 1308, the language model 1304 is embedded with the meaning of transaction descriptions.

XI. Bidirectional Parser

Figure 16:
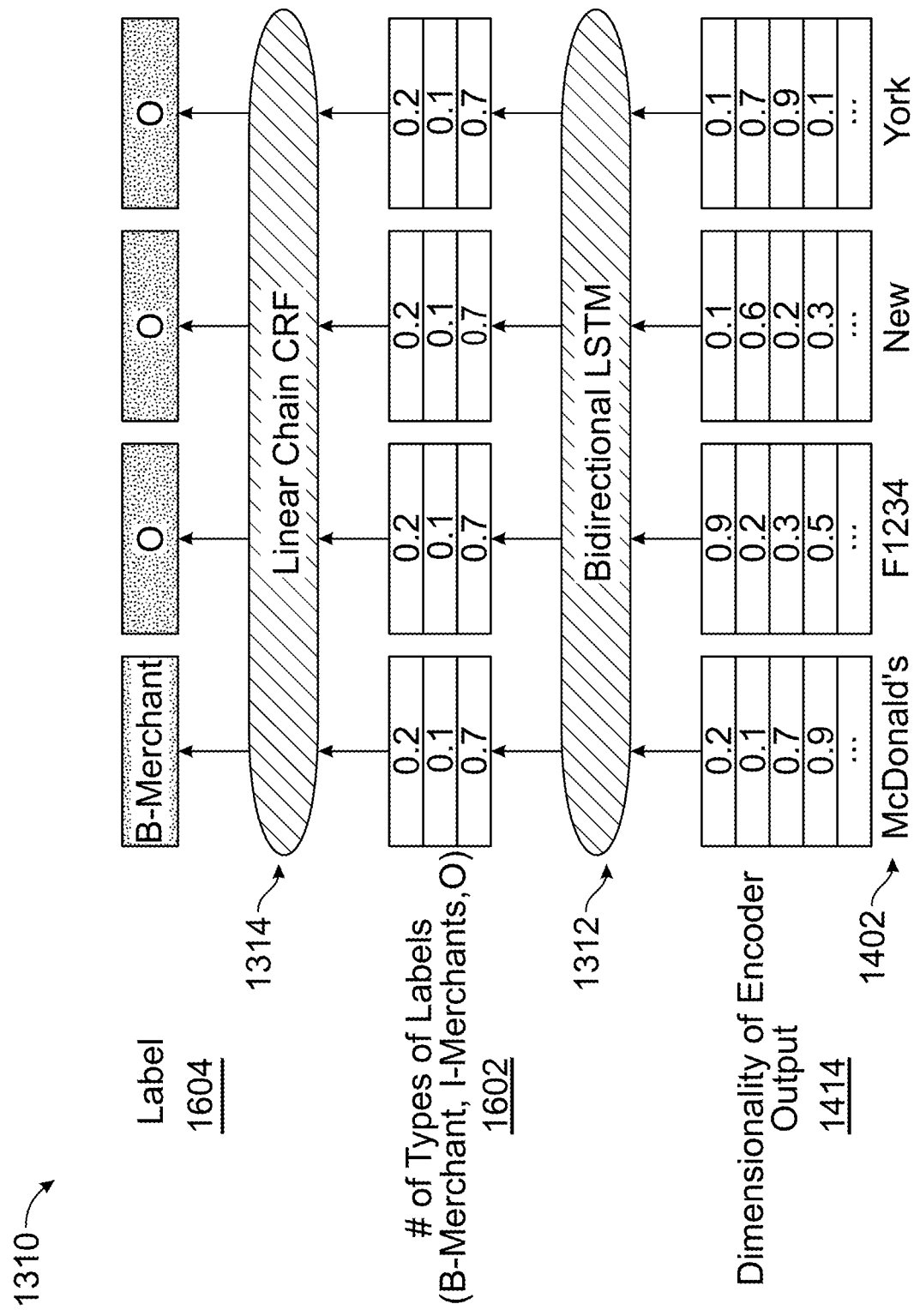
FIG. 16 is an example diagram illustrating the bidirectional parser in accordance with aspects of this disclosure.

Using the encoded sequences 1414 generated by the MLM 1308, the bidirectional parser 1310 can recognize the target entities (e.g., entity and/or location). FIG. 16 is an example diagram illustrating the bidirectional parser 1310 in accordance with aspects of this disclosure. As shown in FIG. 16, the bidirectional parser 1310 includes the bidirectional LSTM 1312 and the linear-chain CRF 1314. The bidirectional LSTM 1312 receives the output 1414 from the masked language model 1308 and generates a 2D matrix 1602 indicative of the type of each token in the original transaction description 1402. The linear-chain CRF 1314 receives the output 1602 from the bidirectional LSTM 1312 and generates labels 1604 for each of the tokens from the original transaction description 1402. Each of the bidirectional LSTM 1312 and the linear-chain CRF 1314 are described in turn below.

XII. Bidirectional LSTM

The traditional Unidirectional LSTM is a member of the recurrent neural network (RNN) family, which is designed to recognize patterns in sequential data such as time series and human language, and its capability of learning long-term dependencies has made it one of the most popular sequential models. To understand the meaning of a target token, it can be important to take words appearing ahead of the target token into account. LSTM models have been shown to perform well on persisting the contextual meaning of the previous text into the target word. Bidirectional LSTMs (such as the bidirectional LSTM 1312) are an extension of the traditional LSTM framework, and can understand contextual information from both directions rather than only the forward direction. By leveraging the bidirectional LSTM framework, the bidirectional LSTM 1312 can effectively function as two separate trained LSTM neural networks, in which one takes the original copy of the text sequence and the other one takes the reversed copy of the text sequence, and eventually aggregates the results together. In this way, each token in the sequence encapsulates the information from both directions and therefore a final prediction can be made having a holistic view of the text sequence.

XIII. Linear-Chain Conditional Random Field

When dealing with sequential text data, there may be, for example, at least two types of dependencies that the linear-chain CRF 1314 is configured to capture.

One type of dependency includes token-wide dependencies. In some situations, the meaning of a token could depend on its surrounding tokens. For example, the word 'New' would be part of a city name when it is followed by 'York' but would be part of an entity name when it is followed by 'Balance'.

Another type of dependent includes label-wide dependencies. The label prediction of a token could also depend on those of its surround tokens. For example, since US location usually appears in the format City +State (e.g. New York NY), the label of 'NY' is more likely to be 'State' if we know that the label of 'York' is 'City.'

In some implementations, the bidirectional LSTM 1312 may take care of the token-wide dependencies of the input sequence, while the Linear Chain CRF 1314 may manage the label-wide dependencies and constrain the form of the output label sequence 1604.

The linear-chain CRF 1314 is configured to manage labels for entity or merchant parsing. In some implementations, there may be three types of labels in total following the BIO labeling convention. The labels can include: 1) B-Merchant: referring to the "Beginning" token of the entity or merchant tokens, e.g. 'Burger' in 'Burger King;' 2) I-Merchant: referring to the "Inside" token of the merchant tokens, e.g. 'King' in 'Burger King;' and 3) O: referring to the "Outside" token (not merchant token).

The linear-chain CRF 1314 may apply certain implied rules, such as, for example: a) B-Merchant should be ahead of the I-Merchant tokens; and b) if a merchant only has 1 token, the label should be B-Merchant instead of I-Merchant.

However, without the linear-chain CRF 1314 layer, the prediction for each label may be performed in an isolated manner, such that it may be possible to output a sequence of labels like 'O, I-Merchant, O, B-Merchant, O.' This type of sequence should never occur in practice, and thus, the use of the linear-chain CRF 1314 prevents such labeling sequences from being produced.

The linear-chain CRF 1314 introduces a sequential dependency in the label predictions 1604 and outputs the most probable series of label predictions 1604. In certain implementations, each possible combination of labels is denoted as a path and assigned a path score. The path score can be defined, for example, as a sum of two individual measurements:

1. Emission score. This may indicate the magnitude of likelihood that a certain entity appears in a certain position. For instance, B-Merchant may be more likely to appear as the first token in the textual sequence, so a B-Merchant label at index 0 would be assigned a higher score.

2. Transition score. This can be assigned to every transition between two entities. For instance, if the previous predicted label is B-Merchant and the current predicted label is I-Merchant, the transition score for B-Merchant->I-Merchant would be assigned. The more common a transition is, the higher the assigned score may be, so the transition score of B-Merchant->I-Merchant may be much higher than that of I-Merchant->B-Merchant.

By combining the emission score and transition score, each possible series of label predictions can be assigned a numeric measure, and the series of label predictions with the highest score can be used as the label output from the linear-chain CRF 1314.

XIV. Results

The combination of the string matching/regex rules and the neural networks described herein provide promising results for location and entity/merchant parsing. In tests of the system 1300, 95% of entity and location information in the transaction descriptions were correctly identified when present.

Figure 17A:
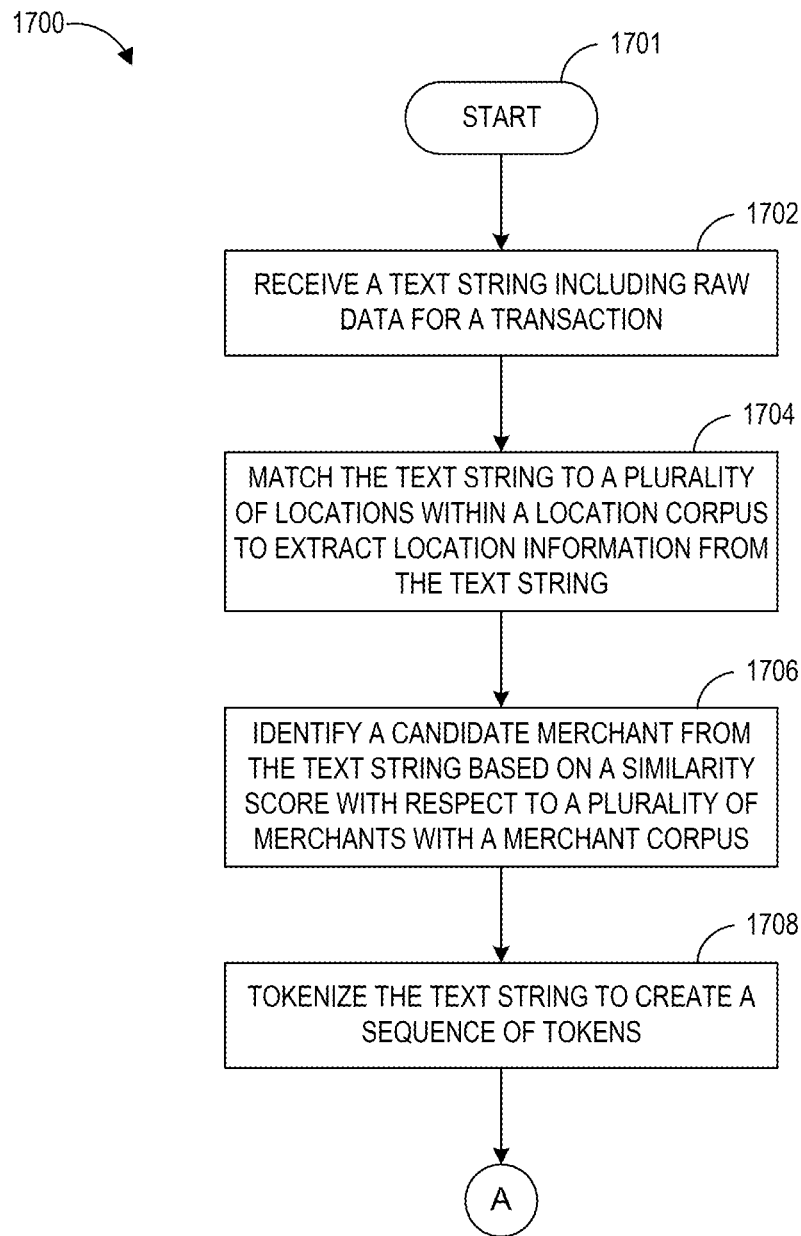
FIGS. 17A and 17B illustrate an example method of parsing raw data associated with one or more transactions.
Figure 17B:
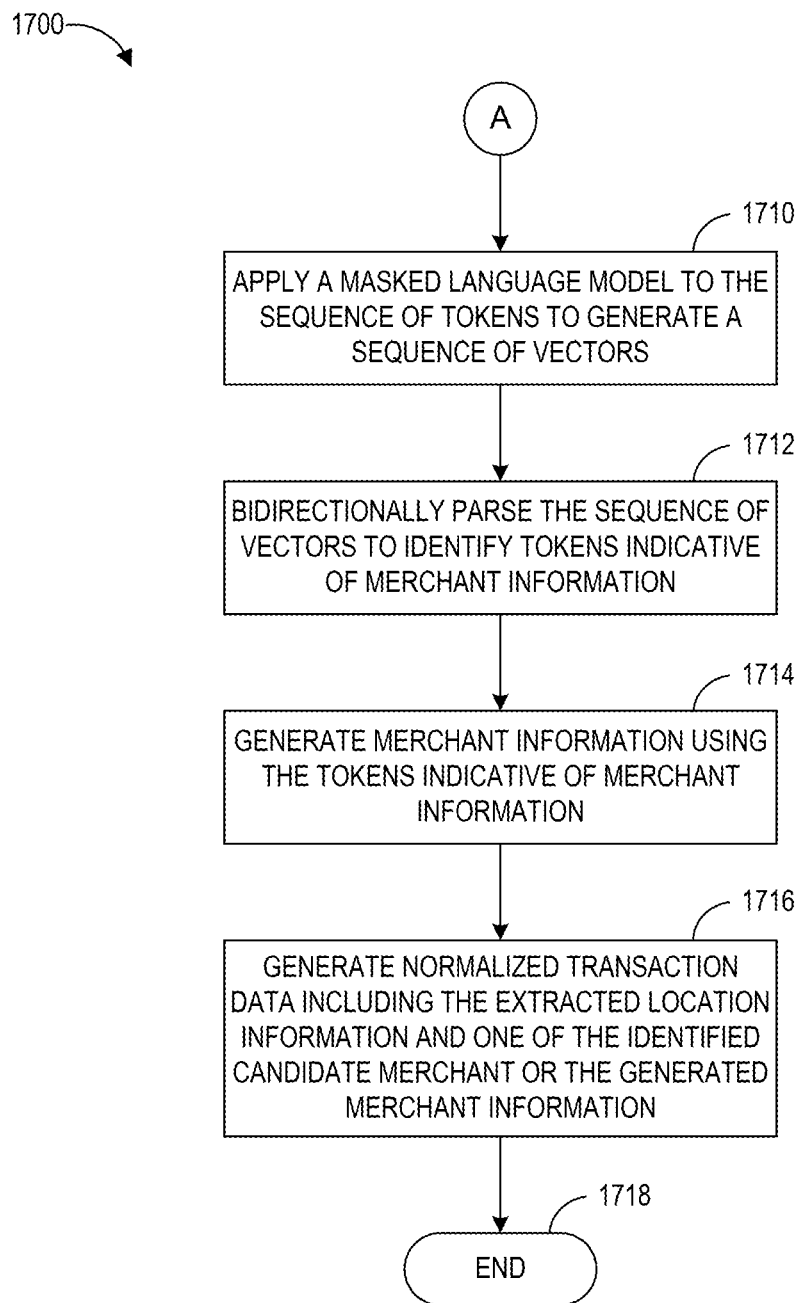

XV. Example Method of Parsing Raw Data Associated with One or More Transactions FIGS. 17A and 17B illustrate an example method 1700 of parsing raw data associated with one or more transactions. The method 1700 may be performed, for example, by the system 1300 illustrated in FIG. 13. In some implementations, one or more of the blocks of the method 1700 may be removed and/or one or more of the blocks may be reordered in accordance with aspects of this disclosure.

The method 1700 starts at block 1701. At block 1702, the pre-processor 1302 receives a text string including raw data for a transaction. At block 1704, the pre-processor 1302 matches the text string to a plurality of entries in a first corpus, for example, matching the text string to a plurality of locations within a location corpus to extract location information from the text string. At block 1706, the pre-processor 1302 compares a portion of the text string to entries in a second corpus, for example, identifying a candidate entity from the text string based on a similarity score with respect to a plurality of entities within an entity corpus.

In response to the similarity score of the identified candidate entity being less than a threshold score, the system 1300 may perform blocks 1708 through 1714. In response to the similarity score of the identified candidate entity being greater than or equal to the threshold score, the system 1300 may proceed directly to block 1716.

At block 1708, the language model 1304 tokenizes the text string to create a sequence of tokens. At block 1710, the language model 1304 applied the masked language model 1308 to the sequence of tokens to generate a sequence of vectors. Each of the vectors may correspond to one of the tokens and may be encoded with information regarding one or more of the surrounding tokens in the sequence of tokens.

At block 1712, the bidirectional parser 1310 bidirectionally parses the sequence of vectors to identify tokens indicative of entity information. At block 1714, the bidirectional parser 1310 generates entity information using the tokens indicative of entity information. At block 1716, the post-processor 1316 generates normalized transaction data including the extracted location information and one of the identified candidate entity or the generated entity information. The method 1700 ends at block 1718. Though the example applications described with reference to of FIGS. 17A and 17B relate to location information and entity information, the parsing techniques implemented are applicable to other types of information/data.

As described in detail herein, aspects of this disclosure relate to systems and techniques which can be applied to parse user account data (e.g., transaction descriptions) in order to generate normalized transaction data in a standardized format. In particular, different entities which generate transaction descriptions may each use a different format for the transaction data used to describe a given transaction. This can result in transaction data which is messy, inconsistent, and convoluted. Since there are a large number of entities generating transaction data, it can be difficult to accurately identify important types of data from the transaction data in order to provide a standardized set of fields (e.g., date, location, entity or merchant name, etc.) which can be more easily deciphered and consumed in a more structured manner. Advantageously, the system of the present disclosure can parse non-standard transaction data to generate normalized transaction data, which is more easily decipherable. In certain aspects, this parsing may be performed using a language model and a bidirectional parser, which can employ machine learning approaches to identify portions of the non-standard transaction data which may be indicative of the standardized fields.

XVI. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

XVII. Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A computer-implemented method of parsing raw data associated with one or more transactions, the computer-implemented method comprising, by one or more hardware processors executing program instructions: receiving a text string including raw data for a transaction; matching the text string to a plurality of locations within a location corpus to extract location information from the text string; identifying a candidate entity from the text string based on a similarity score with respect to a plurality of entities within an entity corpus; in response to the similarity score of the identified candidate entity being less than a threshold score: tokenizing the text string to create a sequence of tokens; applying a masked language model to the sequence of tokens to generate a sequence of vectors, each of the vectors corresponding to one of the tokens and being encoded with information regarding one or more of the surrounding tokens in the sequence of tokens; bidirectionally parsing the sequence of vectors to identify tokens indicative of entity information; and generating entity information using the tokens indicative of entity information; and generating normalized transaction data including the extracted location information and one of the identified candidate entity or the generated entity information.

Clause 2: The computer-implemented method of Clause 1, wherein the masked language model comprises a neural network trained based on a corpus of raw transaction data.

Clause 3: The computer-implemented method of any of Clauses 1-2, wherein the bidirectional parsing comprises applying a first long-short term memory (LSTM) neural network to the sequence of vectors in a first direction and a second LSTM neural network to the sequence of vectors in a second direction opposite to the first direction.

Clause 4: The computer-implemented method of any of Clauses 1-3, wherein the similarity score comprises a modified Jaccard similarity score.

Clause 5: The computer-implemented method of any of Clauses 1-4, wherein the matching of the text string comprises applying fuzzy string matching to the plurality of locations within the location corpus.

Clause 6: The computer-implemented method of any of Clauses 1-5, wherein the sequence of vectors comprises a sequence of multi-dimensional numerical vectors.

Clause 7: The computer-implemented method of any of Clauses 1-6, further comprising, by the one or more hardware processors executing program instructions: in response to the similarity score of the identified candidate entity being less than a threshold score, the normalized transaction data includes the extracted location information and the identified candidate entity.

Clause 8: The computer-implemented method of any of Clauses 1-7, wherein the applying of the masked language model comprises, for each of the tokens in the sequence of tokens: masking the token, sending the sequence of tokens including the masked token though an embedding layer to generate a 2D matrix, encoding the 2D matrix with contextual information using a transformer encoder, and applying a linear transformation to the encoded 2D matrix using a classification layer, wherein the sequence of vectors are based on the linearly transformed encoded 2D matrix calculated for each of the tokens.

Clause 9: The computer-implemented method of any of Clauses 1-8, wherein the bidirectional parsing comprises: generating a 2D matrix indicative of a type of each token in the text string based on the sequence of vectors, and generating a label for each of the tokens in the text string based on the 2D matrix.

Clause 10: The computer-implemented method of Clause 9, wherein the labels comprise a beginning entity token, an inside entity token, and an outside token.

Clause 11: The computer-implemented method of any of Clauses 9-10, wherein the generating of the label for each of the tokens comprises a plurality of rules, including a first rule regarding the relative order of beginning entity token and any inside entity tokens, and a second rule regarding the number of beginning entity tokens.

Clause 12: A system comprising: a computer readable storage medium having program instructions embodied therewith; and one or more processors configured to execute the program instructions to cause the system to perform the computer-implemented method of any of Clauses 1-11.

Clause 13: A computer program product comprising a computer readable storage medium having program instructions embodied therewith, the program instructions executable by one or more processors to cause the one or more processors to perform the computer-implemented method of any of Clauses 1-11.

Clause 14: A non-transitory computer readable medium having stored thereon instructions, which when executed by one or more processors, cause the one or more processors to perform the computer-implemented method of any of Clauses 1-11.

What is claimed is:

1. A computer-implemented method comprising, by one or more hardware processors executing program instructions:
   receiving a text string including raw data for a transaction;
   tokenizing the text string to create a sequence of tokens;
   applying a masked language model to the sequence of tokens to generate a sequence of vectors, each of the vectors corresponding to one of the tokens and being encoded with information regarding one or more of surrounding tokens in the sequence of tokens,
      wherein applying the masked language model comprises:
         masking a token of the sequence of tokens,
         sending the sequence of tokens including the masked token through an embedding layer to generate a 2D matrix,
         encoding the 2D matrix with contextual information using a transformer encoder, and
         applying a linear transformation to the encoded 2D matrix using a classification layer,
            wherein the sequence of vectors are based on the linearly transformed encoded 2D matrix calculated for each of the tokens;
   bidirectionally parsing the sequence of vectors to identify tokens indicative of entity information;
   generating entity information using the tokens indicative of entity information; and
   generating normalized transaction data including the generated entity information.

2. The computer-implemented method of claim 1, wherein the masked language model comprises a neural network trained based on a corpus of raw transaction data.

3. The computer-implemented method of claim 1, wherein the bidirectional parsing comprises applying a first long-short term memory (LSTM) neural network to the sequence of vectors in a first direction and a second LSTM neural network to the sequence of vectors in a second direction opposite to the first direction.

4. The computer-implemented method of claim 1, wherein the sequence of vectors comprises a sequence of multi-dimensional numerical vectors.

5. The computer-implemented method of claim 1, wherein the bidirectional parsing comprises:
   generating a 2D matrix indicative of a type of each token in the text string based on the sequence of vectors, and
   generating a label for each of the tokens in the text string based on the 2D matrix.

6. The computer-implemented method of claim 5, wherein the label comprises a beginning entity token, an inside entity token, and an outside token.

7. The computer-implemented method of claim 6, wherein the generating of the label for each of the tokens comprises a plurality of rules, including a first rule regarding a relative order of beginning entity token and any inside entity tokens, and a second rule regarding a number of beginning entity tokens.

8. The computer-implemented method of claim 1, wherein the one or more hardware processors are associated with a multi-tenant system.

9. A system comprising:
   one or more processors; and
   a non-transitory computer readable memory having stored thereon instructions which, when executed by the one or more processors, cause the one or more processors to:
      receive a text string including raw data for a transaction;
      tokenize the text string to create a sequence of tokens;
      apply a masked language model to the sequence of tokens to generate a sequence of vectors, each of the vectors corresponding to one of the tokens and being encoded with information regarding one or more of surrounding tokens in the sequence of tokens,
         wherein applying the masked language model comprises:
            masking a token of the sequence of tokens,
            sending the sequence of tokens including the masked token through an embedding layer to generate a 2D matrix,
            encoding the 2D matrix with contextual information using a transformer encoder, and
            applying a linear transformation to the encoded 2D matrix using a classification layer,
               wherein the sequence of vectors are based on the linearly transformed encoded 2D matrix calculated for each of the tokens;
      bidirectionally parse the sequence of vectors to identify tokens indicative of entity information;
      generate entity information using the tokens indicative of entity information; and
      generate normalized transaction data including the generated entity information.

10. The system of claim 9, wherein the masked language model comprises a neural network trained based on a corpus of raw transaction data.

11. The system of claim 9, wherein the bidirectional parsing comprises applying a first long-short term memory (LSTM) neural network to the sequence of vectors in a first direction and a second LSTM neural network to the sequence of vectors in a second direction opposite to the first direction.

12. The system of claim 9, wherein the sequence of vectors comprises a sequence of multi-dimensional numerical vectors.

13. The system of claim 9, wherein the bidirectional parsing comprises:
   generating a 2D matrix indicative of a type of each token in the text string based on the sequence of vectors, and
   generating a label for each of the tokens in the text string based on the 2D matrix.

14. The system of claim 9, wherein the system is associated with a multi-tenant system.

15. A non-transitory computer readable medium having stored thereon instructions, which when executed by one or more processors, cause the one or more processors to:
receive a text string including raw data for a transaction;
tokenize the text string to create a sequence of tokens;
apply a masked language model to the sequence of tokens to generate a sequence of vectors, each of the vectors corresponding to one of the tokens and being encoded with information regarding one or more of surrounding tokens in the sequence of tokens,
wherein applying the masked language model comprises:
masking a token of the sequence of tokens,
sending the sequence of tokens including the masked token through an embedding layer to generate a 2D matrix,
encoding the 2D matrix with contextual information using a transformer encoder, and
applying a linear transformation to the encoded 2D matrix using a classification layer,
wherein the sequence of vectors are based on the linearly transformed encoded 2D matrix calculated for each of the tokens;
bidirectionally parse the sequence of vectors to identify tokens indicative of entity information;
generate entity information using the tokens indicative of entity information; and
generate normalized transaction data including the generated entity information.

16. The non-transitory computer readable medium of claim 15, wherein the masked language model comprises a neural network trained based on a corpus of raw transaction data.

17. The non-transitory computer readable medium of claim 15, wherein the bidirectional parsing comprises applying a first long-short term memory (LSTM) neural network to the sequence of vectors in a first direction and a second LSTM neural network to the sequence of vectors in a second direction opposite to the first direction.

18. The non-transitory computer readable medium of claim 15, wherein the sequence of vectors comprises a sequence of multi-dimensional numerical vectors.

19. The non-transitory computer readable medium of claim 15, wherein the bidirectional parsing comprises:
generating a 2D matrix indicative of a type of each token in the text string based on the sequence of vectors, and
generating a label for each of the tokens in the text string based on the 2D matrix.

20. The non-transitory computer readable medium of claim 15, wherein the non-transitory computer readable medium is associated with a multi-tenant system.

* * * * *